(12) United States Patent
Lanham et al.

(10) Patent No.: US 9,958,544 B2
(45) Date of Patent: May 1, 2018

(54) VESSEL-TOWED MULTIPLE SENSOR SYSTEMS AND RELATED METHODS

(71) Applicant: The United States of America as represented by the Secretary of the Navy, Washington, DC (US)

(72) Inventors: Robert S Lanham, Bedford, IN (US); William R Stocke, Jr., Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days. days.

(21) Appl. No.: 15/075,084

(22) Filed: Mar. 18, 2016

(65) Prior Publication Data

US 2016/0320484 A1    Nov. 3, 2016

Related U.S. Application Data

(60) Provisional application No. 62/134,729, filed on Mar. 18, 2015.

(51) Int. Cl.
| | |
|---|---|
| *B60L 3/00* | (2006.01) |
| *B60L 15/00* | (2006.01) |
| *G05D 1/00* | (2006.01) |
| *G05D 3/00* | (2006.01) |
| *G06F 7/00* | (2006.01) |
| *G06F 17/00* | (2006.01) |

(Continued)

(52) U.S. Cl.
CPC ............ *G01S 15/025* (2013.01); *B63B 43/18* (2013.01); *B63C 11/48* (2013.01); *B63G 8/38* (2013.01);
(Continued)

(58) Field of Classification Search
USPC ....................................................... 701/21
See application file for complete search history.

(56) References Cited

U.S. PATENT DOCUMENTS

| | | | | |
|---|---|---|---|---|
| 3,364,895 A | * | 1/1968 | De Jong | B63B 21/58 114/253 |
| 4,721,055 A | * | 1/1988 | Pado | B63C 11/52 114/330 |

(Continued)

FOREIGN PATENT DOCUMENTS

| | | | |
|---|---|---|---|
| CN | 101177229 B | * | 6/2010 |
| EP | 0498388 | | 8/1992 |

OTHER PUBLICATIONS

AIS Marine Traffic (http://www.marinetraffic.com/FAQ), Frequently Asked Questions, 22 pages, printed Mar. 18, 2016.

(Continued)

*Primary Examiner* — Jean-Paul Cass
(74) *Attorney, Agent, or Firm* — Christopher A. Monsey

(57) ABSTRACT

An embodiment can include a vessel-towed system that includes a first towing/communication interface system, e.g., a first tow cable with a fiber optic system, and spaced apart buoys for supporting the first tow cable. A first mobile structure including a first control system and first type of emitter, e.g., an attraction system, is connected to the first tow cable. A second mobile structure is provided that can include an underwater towed emitter such as an audio emulation system. The first and second emitters can be configured emit a first and second plurality of emissions for inducing a receiving entity response. The second mobile structure is coupled with the first mobile structure with a second tow cable that comprises another fiber optic cable. An automated response or manual control systems can be provided on the towing vessel and the first mobile structure adapted to operate the first and second emitters.

6 Claims, 26 Drawing Sheets

(51) Int. Cl.
    *G01S 15/02*     (2006.01)
    *B63H 25/04*     (2006.01)
    *B63C 11/48*     (2006.01)
    *B63G 8/42*     (2006.01)
    *F41J 9/06*     (2006.01)
    *B63B 43/18*     (2006.01)
    *B63G 8/38*     (2006.01)
    *G01S 15/88*     (2006.01)
    *G01S 7/00*     (2006.01)
    *G01S 7/02*     (2006.01)
    *G01S 13/86*     (2006.01)
    *B63B 21/66*     (2006.01)
    *G01S 15/89*     (2006.01)
    *B63H 25/38*     (2006.01)
    *B63B 22/00*     (2006.01)

(52) U.S. Cl.
    CPC ............. *B63G 8/42* (2013.01); *B63H 25/04* (2013.01); *F41J 9/06* (2013.01); *G01S 7/003* (2013.01); *G01S 7/02* (2013.01); *G01S 13/862* (2013.01); *G01S 15/88* (2013.01); *B63B 21/66* (2013.01); *B63B 22/00* (2013.01); *B63H 25/38* (2013.01); *B63H 2025/045* (2013.01); *G01S 15/8902* (2013.01)

(56) References Cited

U.S. PATENT DOCUMENTS

| | | | |
|---|---|---|---|
| 4,930,719 A * | 6/1990 | Sehl | B63B 35/816 114/254 |
| 6,359,834 B1 * | 3/2002 | English | F41G 7/228 367/133 |
| 7,156,036 B2 * | 1/2007 | Seiple | B63B 27/36 114/254 |
| 7,775,174 B1 * | 8/2010 | Humphreys | B63C 11/42 114/244 |
| 8,291,757 B2 | 10/2012 | Johnson et al. | |
| 8,364,331 B2 * | 1/2013 | Tureaud | B63B 21/66 701/21 |
| 8,430,049 B1 * | 4/2013 | Tureaud | B63G 8/42 114/258 |
| 8,770,129 B2 * | 7/2014 | Hawkes | B63C 11/34 114/230.21 |
| 8,816,894 B1 * | 8/2014 | Apgar | H01Q 15/20 342/10 |
| 8,973,511 B2 | 3/2015 | Holemans | |
| 9,592,895 B2 * | 3/2017 | Yu | B63G 8/001 |
| 2002/0152945 A1 * | 10/2002 | Geriene | B63C 11/42 114/312 |
| 2007/0019504 A1 * | 1/2007 | Howlid | G01V 1/3826 367/16 |
| 2013/0179047 A1 * | 7/2013 | Miller | B60W 30/09 701/70 |

OTHER PUBLICATIONS

AIS Marine Traffic (http://www.marinetraffic.com), Home page/map, 1 page, printed Mar. 18, 2016.
NOAA, Tracking Tsunamis (http://oceantoday.noaa.gov/trackingtsunamis/), 3 pages, printed Mar. 18, 2016.
Wikipedia, Automatic Identification System (https://en.wikipedia.org/wiki/Automatic_Identification_System), 14 pages, printed Mar. 18, 2016.

* cited by examiner

VESSEL-TOWED MULTIPLE SENSOR SYSTEMS AND RELATED METHODS

CROSS-REFERENCE TO RELATED APPLICATION

This patent application claims priority to U.S. Provisional Patent Application Ser. No. 62/134,729, filed Mar. 18, 2015, the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,113) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

Aspects disclosed herein relate to a multiple towed attraction, emulation, and response alteration system that can include multi-mode emitter systems, multiple control systems, maneuver, propulsion, high and/or low speed support structures, as well as multiple towing and communication systems.

Some types of attraction, emulation, and/or response alteration (AERA) systems include a remotely operated towed system that can employ an underwater attraction body which can be towed behind a vessel on a combination tow and signal fiber optic tow cable ("FOTC"). For example, a towed AERA systems can only be used for short durations, and are typically unrecoverable, a "one-and-done" type attraction/emulation/response alteration. Furthermore, the current towed entity of interest AERA system can only be used for a narrow range of activities projected by receiving or transmitting entity or entities. Additionally, maintaining and preserving a fired, launched, or deployed towed AERA body is intensive due to its susceptibility to environmental conditions such as wind, rain, and salty oceanic conditions.

An apparatus in accordance to an embodiment of the present disclosure provides a towed AERA system with improved capabilities beyond those of existing launched, fired, or deployed, including a towed, anti-threat AERA countermeasure systems. An active towed AERA system can combine current AERA system's components such as a remotely operated input and output interface, a local input and out interface, a power supply, a winch system, and a FOTC with a towed AERA body. A towed AERA body can provide the ability for a host vessel to transmit radio frequencies to the towed AERA body that can emulate behavior of another entity such as a whale or the towing vessel's noise, such as, for example, propeller noise, engine noise, and vessel's frequencies, which can be more attractive to a receiving or transmitting entity. Additionally, a towed AERA body can utilize a signal cutout switch in combination with onboard control and sensor systems to enable it to act independent of a towing vessel's remotely operated input and output interface. Furthermore, a towed body, e.g., an attraction, emulation, or response alteration body, can have the ability to have different types of modules swapped in and out of it so that the towed AERA body can emulate different types of entity of interest characteristics such as a whale or aquatic entity sound, vessel frequencies, engine noise, propeller noise, or the like which can also be determined based on a type of vessel the towed body follows. For example, a receiving entity can be a whale that the towing vessel seeks to encourage the whale to alter its path or response to the output of the towed AERA body.

According to an illustrative embodiment of the present disclosure, an attraction, emulation, and response alteration system can include a remote operated input and output interface, and a local input and output interface. Both the remote operated input and output interface, and local input and output interface have the ability to actively control a towed AERA body. The local input and output interface can be attached to a multiplexer, which can give a towed AERA body the potential to add a plurality of connections, which can allow for additional towed AERA bodies to be attached to the towed AERA body. Additionally, a multiplexer can be a way path to select AERA settings depending on the threat that a vessel encounters, such as, for example, the AERA setting can draw a threat toward a low value unit, instead of a high value unit.

According to a further illustrative embodiment of the present disclosure, a FOTC can have a plurality of buoyancy nodes spaced from a winch system to a towed AERA body such as the first mobile structure. An exemplary buoyancy node acts as a flotation device to the FOTC to help address stress caused by drag from weight of the FOTC. A buoyancy node can be for example, a can buoy, conical buoy, spherical buoy, pillar buoy, or the like. An embodiment of the buoys can include a shape or design that reduces drag. The buoy system can also include a maneuvering system which can adjust orientation of the buoys with respect to a towing structure as well as towed mobile structures such as the first and second mobile structures.

In an exemplary embodiment a towed attraction body can be quickly deployed and activated. In embodiments a towed AERA body can have an increased effectiveness by being able to withstand long durations in rough environmental conditions allowing vessels to continuously have an active towed AERA body in the water.

In certain embodiments a towed system can convert from a stand-alone attraction system with an active electronic attraction (EA) payload to a more sophisticated electronic emulation or response alteration platform with the ability to send and received payload information via a FOTC, such as, for example a towed AERA body can receive, amplify, and return, e.g., radio frequency signals from a transmitting entity that can present a higher profile or attractive sensed presence to attract attention from the receiving or transmitting entity.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Generally, one embodiment in accordance with the invention can include a vessel-towed system that includes a first towing/communication interface system that couples with a first mobile structure, e.g., an above water structure including a first controls system and first type of emitter, e.g., an active radio frequency ("RF") attraction system that couples with a second towing/communication system that couples with a second mobile structure that can include an underwater towed emitter such as an audio emulation system where the first and second emitters can be used to modify a response from a receiving entity. In some embodiments, a second emitter could include an optional FOTC extension allowing another towed body to also be simultaneously deployed, but as a stand-alone torpedo decoy with or without operating a radar or jamming system on the mobile structure. Embodiments can further include automated response and manual control systems on a towing mobile structure as well as a maneuvering and propulsion system on at least the first mobile structure. An embodiment can also include structures that enable high speed traversal of, for example, water (e.g. a lifting structure or hydroplanes). An embodiment can also include maneuvering systems such as one or more axis controls system on both the first and second mobile structures. An embodiment can also include propulsive systems which permit independent maneuvering and propulsion of the first mobile structure where such propulsive systems can include an automated wind powered system. Embodiments of the invention can include various AERA systems on the first and second mobile structures which are capable of autonomous operation as well as controlled operation from a towing vehicle or structure, e.g. a ship.

Figure 1:
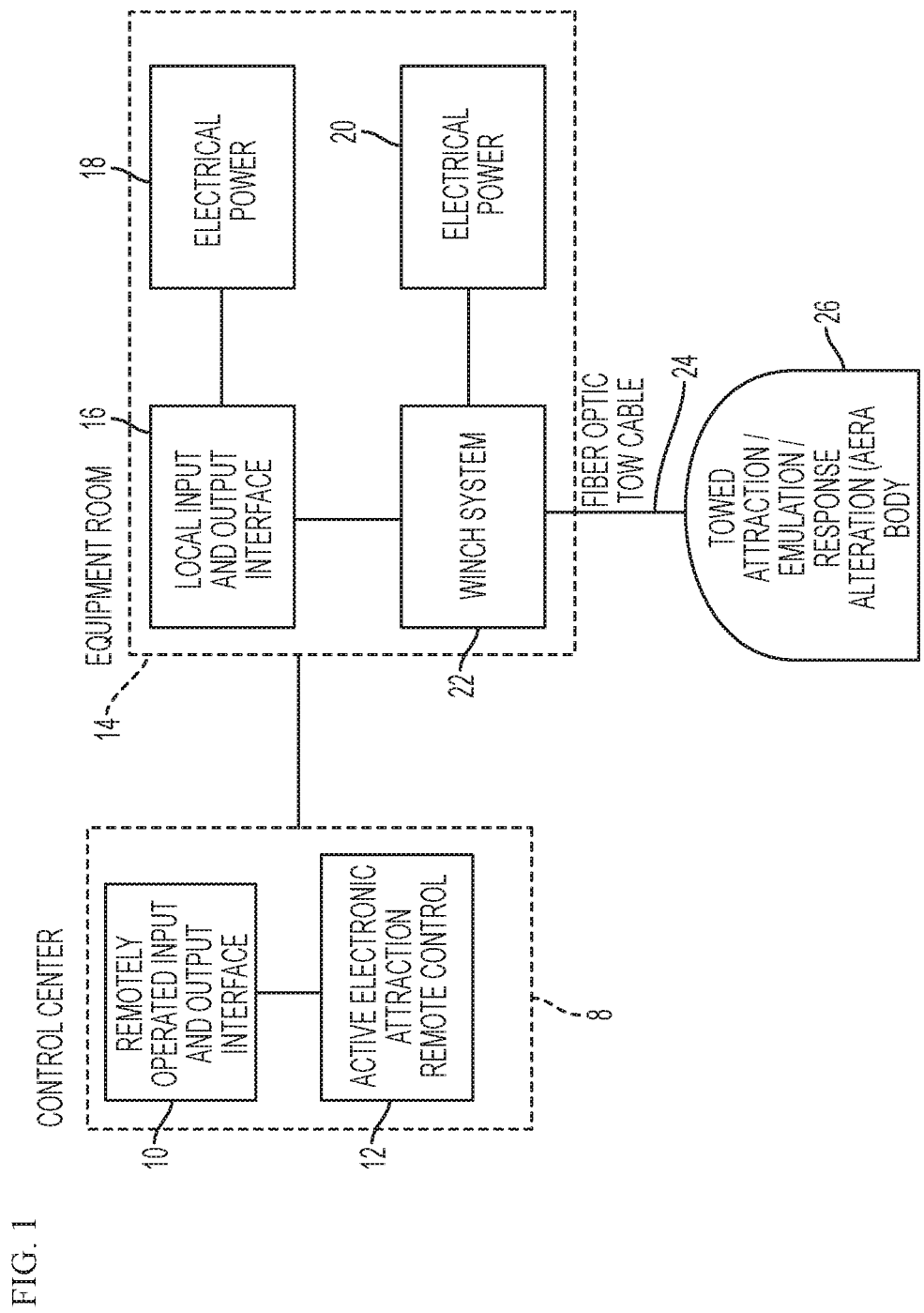
FIG. 1 shows a simplified system level diagram of one embodiment of the invention or disclosure herein.

Referring initially to FIG. 1, a block diagram of an embodiment. Embodiments can include an information center 8. An information center 8 can be located on a vessel (not shown). In certain embodiments an information center 8 can include a remotely operated input and output interface 10, and an active EA/emulation/response alteration remote control 12. In embodiments a remotely operated input and output interface 10 can transmit information from an active EA/emulation/response alteration remote control 12. In certain embodiments a remotely operated input and output interface can transmit information to a towed AERA body 26 (hereinafter towed AMRA body). In some embodiments, an information center 8 can be connected to the vessel's equipment room 14 which can include a local input and output interface 16, which can be attached to the vessel's electrical power 18, or can have its own power supply. In some embodiments, a local input and output interface 16 can be coupled to a FOTC 24 via a rotational electrical coupler in a FOTC winch system 22. In certain embodiments the FOTC winch system 22 can be, for example, a hydraulic winch system, an electric winch system, or the like. The FOTC winch system 22 can include a reel for retracting or extending the FOTC 24. The FOTC 24, which can be attached to the towed AMRA body 26. To prevent binding and tangling of the FOTC, and to allow free rotation between the winch system 22, FOTC 24, and towed AERA body 26 a rotation device (not shown) can be attached to the towed AERA body, and the winch system such as, for example, a slip ring, or the like.

Figure 2:
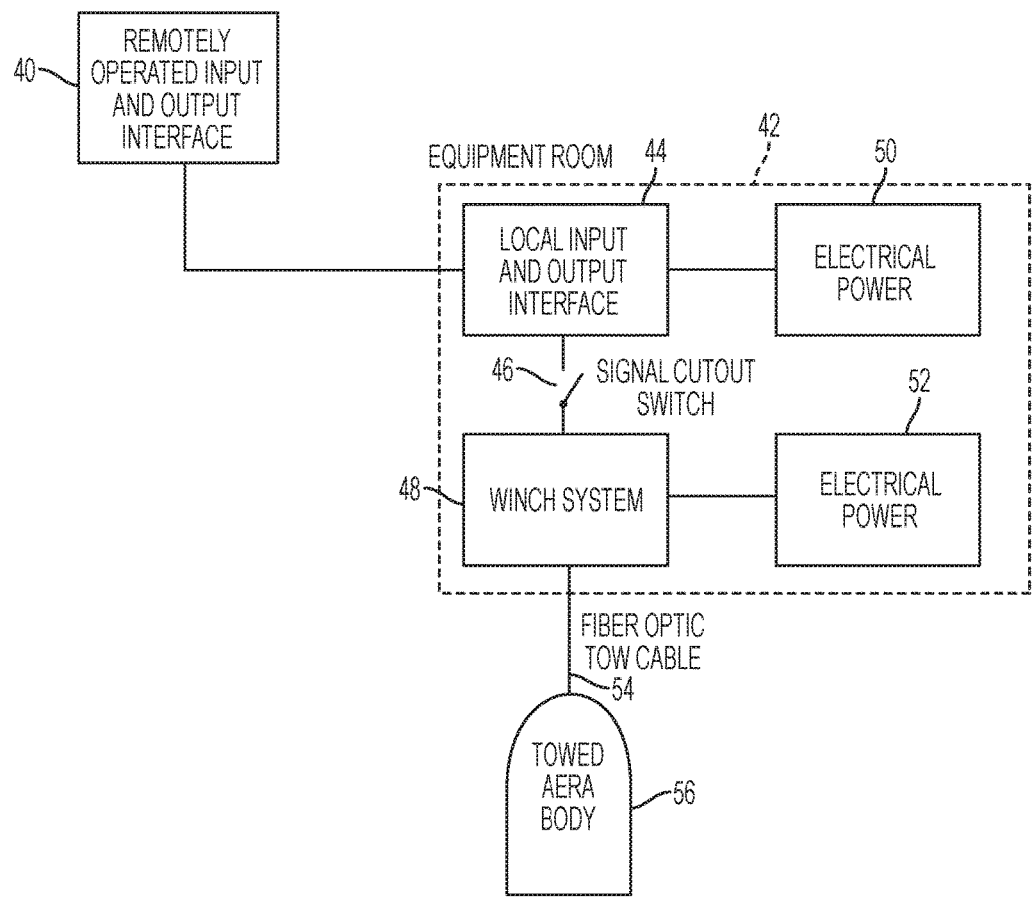
FIG. 2 shows another simplified system level diagram of an additional embodiment as disclosed herein.

Referring to FIG. 2, a block diagram of an additional embodiment is shown. A remotely operated input and output interface 40 is provided that can be connected to systems in an equipment room 42. The equipment room 42 can include a local input and output interface 44 that can be connected to an electrical power system 50. In certain embodiments the electrical power system 50 can be a vessel's power, a battery unit, or the like. The local input and output interface 44 can be connected to a signal cutout switch 46. In certain embodiments a signal cutout switch 46 can electrically isolate or separate a towed AERA body (hereinafter towed attraction body) 56 from the local input and output interface 16 allowing the towed AERA body 56 to be a stand-alone radio frequency system without needing to receive or send signals to and from an outside source such as an active EA/emulation/response alteration control (not shown) that feeds control signals to the towed attraction body 56. A signal cutoff switch 46 can be connected to control lines that are coupled to a FOTC 54 that is extended or retracted through a winch system 48. In certain embodiments the winch system 48 can be, for example, a hydraulic winch system, an electric winch system, or the like. The FOTC 54 is attached to the towed attraction body 56. A slip ring (not shown) can be incorporated into the winch system to enable interface of electrical signals between the FOTC 54 and the local input and output interface 44 across the rotational coupling of the winch system.

Figure 3:
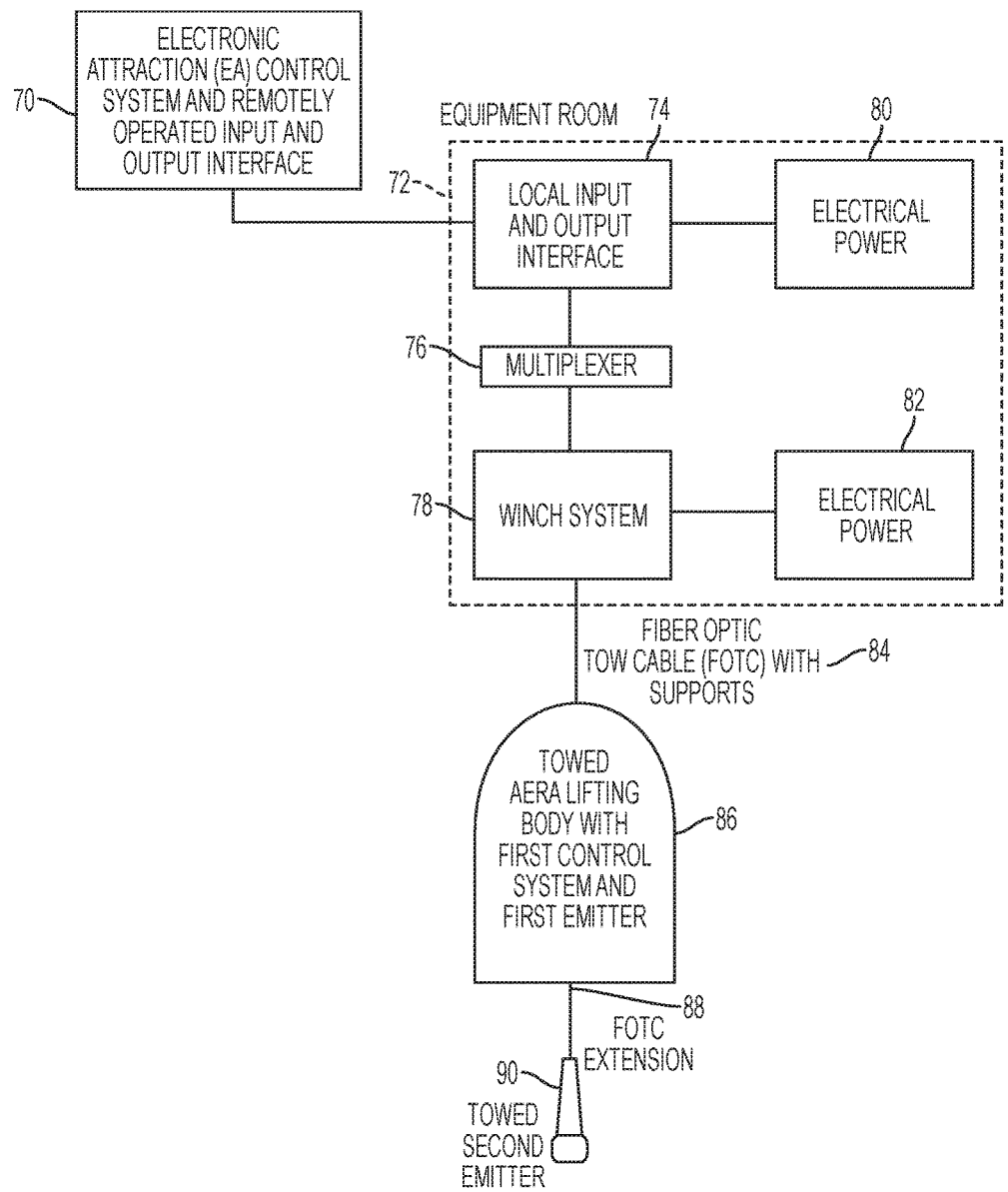
FIG. 3 shows another simplified system level diagram of an additional embodiment as disclosed herein.

Referring to FIG. 3, a simplified block diagram of an additional embodiment is shown that can include a remotely operated input and output interface 70 that can be connected to an equipment room 72. An equipment room can include a local input and output interface 74, which can be attached to a vessel's electrical power system 80. Additionally, the equipment room 72 can include a multiplexer 76, which is attached to the local input and output interface 74 and the winch system 78. The multiplexer 76 can enable interfacing between a towed attraction lifting body with first control system and first emitter (hereinafter first towed system) 86 and the towed second emitter 90. For example, the multiplexer 76 can facilitate an interface between both first towed system 86 and EA control system 70 from the equipment local input and output interface 74 or the remote input and output interface 70 for the towed body 86 and the towed emitter 90 to add operability and control emitters first and second emitters as well as other sensors (not shown) that can be mounted on the towed structures 86, 90. A winch system 78 can be attached to a vessel's (not shown) electrical power 82 or can have its own power source through a battery source (not shown). The winch system 78 can be attached to a FOTC 84, which can be attached to a towed AERA body, e.g., first towed system 86. To prevent binding and tangling and to allow free rotation between the winch system 78, FOTC 84, and towed AERA body, e.g., first towed system 86 a rotation device (not shown) for aiding in operation, extending and retracting the FOTC attached to the towed AERA body, e.g., first towed system, and the winch system such as, for example, a slip ring, or the like. In certain embodiments a towed AERA body, e.g., first towed system 86 can have an FOTC extension 88, which can connect a towed anti-threat body 90. In certain embodiments an anti-rotation device (not shown) can be attached to a towed AERA body 86, and can connect a FOTC extension 88, and towed anti-threat body 90.

Figure 4:
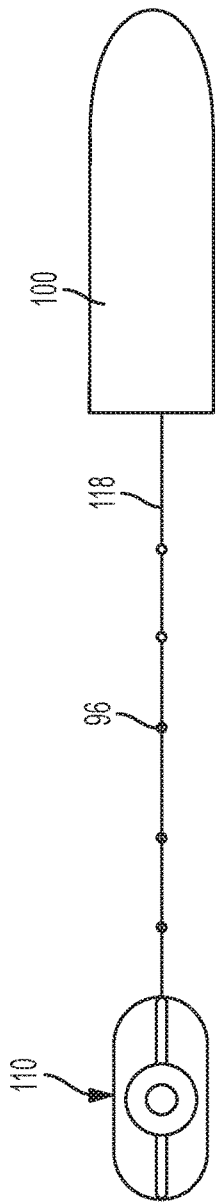
FIG. 4 shows a general system level overview of a portion of an embodiment as disclosed herein.

Referring to FIG. 4, shown is a general overview of an exemplary embodiment. In embodiments a control center (not shown) and an equipment room (not shown) can be located on a vessel 100. A FOTC 118 can be attached to the vessel 100 via a winch system (not shown). A plurality of buoyancy nodes 96 can be attached and spaced along the length of the FOTC 118 to distribute the weight evenly across the FOTC from the vessel 100 to the towed AERA body 110, and to help prevent excess drag to the system while the vessel tows the towed AERA body.

Figure 5:
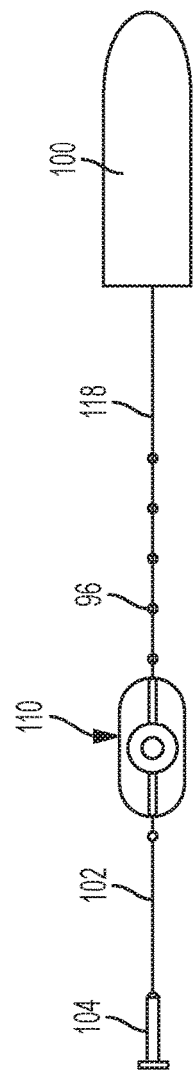
FIG. 5 shows a general system overview of an additional embodiment as disclosed herein.

Referring to FIG. 5, shown is a general overview of an additional embodiment. In embodiments a control center (not shown) and an equipment room (not shown) can be located on a vessel 100. A FOTC 118 can be attached to the vessel 100 via a winch system (not shown). A plurality of buoyancy nodes 96 can be attached and spaced along the length of the FOTC 118 to distribute the weight evenly across the FOTC from the vessel 100 to the towed AERA body 110. A towed AERA body can have a FOTC extension 102 affixed to its aft end to support a towed anti-threat body 104. Referring to FIG. 5, a towed body 104 can be selected from the group including a sonar system, a radar system, an imaging sonar system, a decoy system, an existing ocean floor fiber optic cable, a floating buoy, an object detector, an object attracting system, and an object decoy system. One example of a torpedo decoy system includes a towed electroacoustic decoy device (e.g., TB-14A) and a shipboard signal generator. The decoy emits signals to draw a torpedo away from its intended target including propulsion noises. Variants can include a FOTC and a motor powering a winch e.g., a double drum winch. A diagnostic program can be initiated locally or from the remote control station, and tests all electronic functions. Additional variants can incorporate a towed array sensor to detect underwater objects such as submarines and incoming torpedoes. Variants can also include additional active sonar decoys by receiving, amplifying, and returning "pings" from the torpedo, presenting a larger false target to the torpedo. One example of an object attracting system can include a variant that records marine mammal sounds and then selects known patterns that attract a mammal by mirroring a sonar ping, recording a sonar ping, amplifying a sonar ping, or modifying a sonar ping at a pattern known to attract the animal toward the signal. One example of an object deterring system can include a variant that records marine mammal sounds and then selects known patterns that deter a mammal by mirroring a sonar ping, recording a sonar ping, amplifying a sonar ping, or modifying a sonar ping at a pattern known to deter the animal away from the signal.

Figure 6:
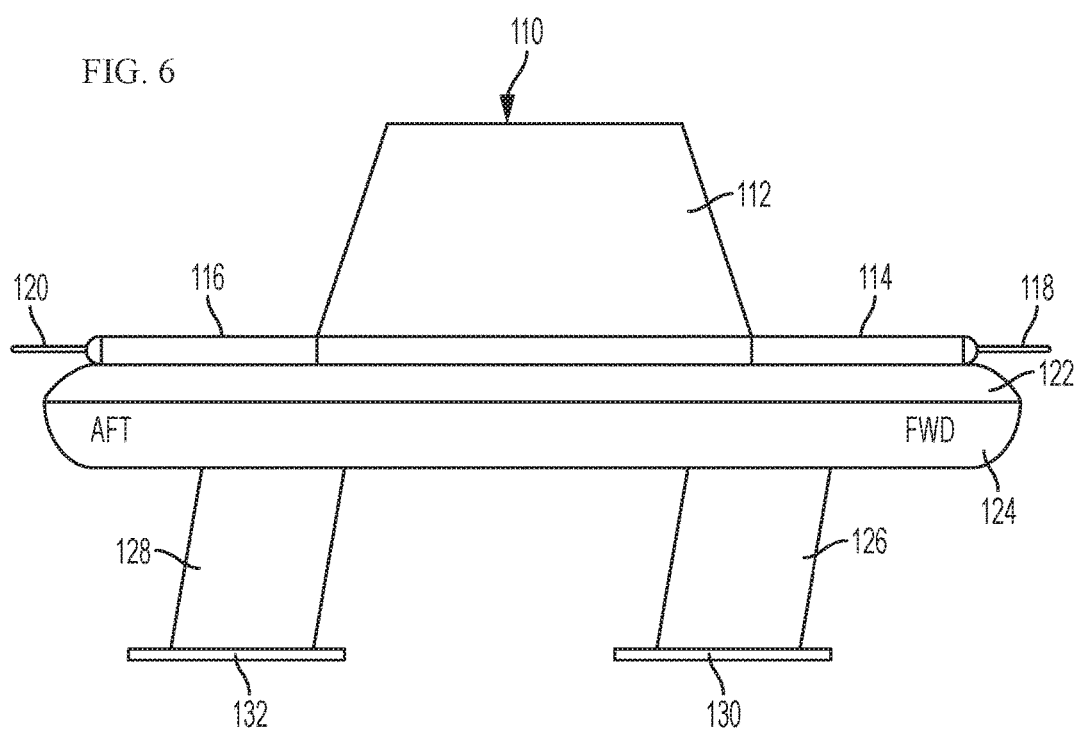
FIG. 6 shows a side view of one section of an exemplary embodiment of the invention.
Figure 7:
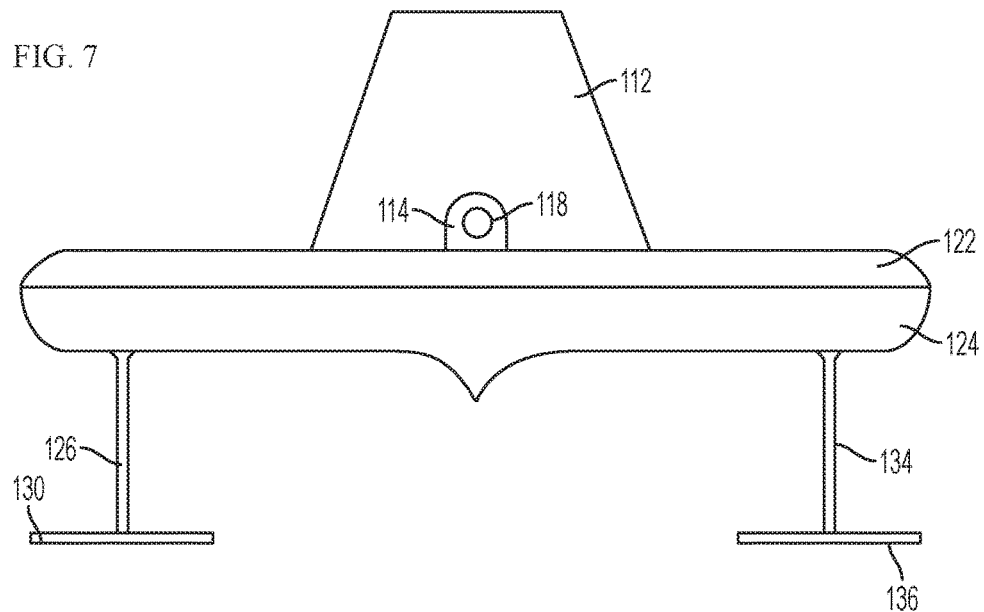
FIG. 7 shows a front view of one section of an exemplary embodiment of the invention.
Figure 8:
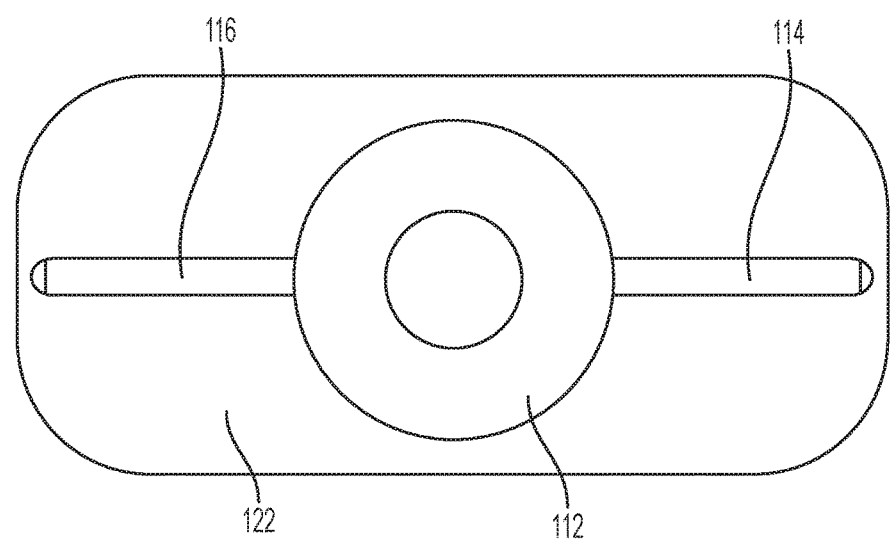
FIG. 8 shows a top view of one section of an exemplary embodiment of the invention.

Referring to FIGS. 6, 7 and 8, a towed AERA body is shown generally at 110. Embodiments comprise a top section 122 and a bottom section 124. An electronics housing 112 protrudes from and can be attached to a top section 122. In embodiments an electronics housing 112 can encapsulate electronics that support a plurality of modules that can emulate different type of radio frequencies, engine sounds, propeller noises, or the like from the vessels that it is towed behind. In addition, a top section 112 can be a variety of shapes such as, for example, an ellipse, an airfoil, a parabola, an ogive, any other streamline body, or the like. A FOTC interface 114 can be attached to a top section 122 with the length of the FOTC interface running parallel to the side of the top section until it attaches to an electronics housing 112. A FOTC interface 114 can support a rotation device (not shown) either housed on the inside of the FOTC interface, or on the outside of the FOTC interface, which can allow a FOTC 118 to rotate freely. In certain embodiments a rotation device (not shown) can be a slip ring or the like. In embodiments a second FOTC interface 116 can be attached to the aft end of an electronics housing 112, and can run parallel to the side of a top section 122 to the aft end of the top section. A second FOTC interface can have a rotation device (not shown) housed and attached either inside or outside of the second FOTC interface.

A first 126, second 128, third 134, and fourth (not shown) strut can be attached to and protrude from a bottom section 124. However, a strut need not be limited to four, there can be one, two, three, four, five, or the like struts. A first 130, second 132, third 136, and fourth foil (not shown) can be attached to a first 126, second 128, third 134, and fourth (not shown) strut. Additionally, a foil need not be limited to four, there can be such as, for example, one, two, three, four, or the like foils.

Figure 9:
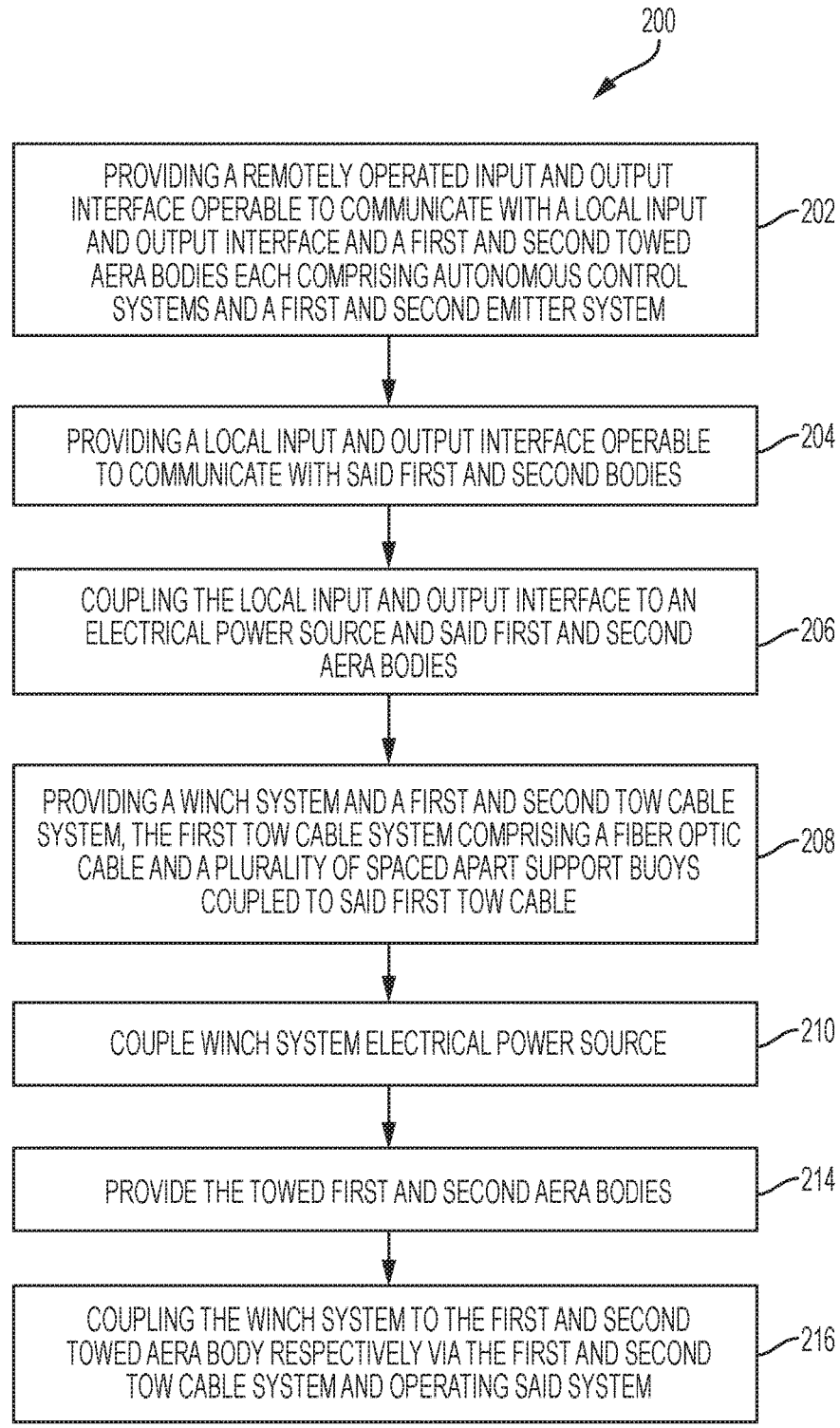
FIG. 9 shows a method of manufacturing and use in accordance with an exemplary embodiment of the invention.

With reference to FIG. 9, an illustrative method 200 of using an active towed AERA system of the present disclosure includes providing a remotely operated input and output interface operable to communicate with a local input and output interface and a first and second towed AERA bodies each comprising autonomous control systems and a first and second emitter system at step 202 operable to communicate with a local input and output interface at step 204. The local input and output interface can be coupled to either the vessel's electrical power or some other type of external power source at step 206. Step 208 includes providing a winch system and a first and second tow cable system, the first tow cable system comprising a fiber optic cable and a plurality of spaced apart support buoys coupled to the first tow cable for supporting the first cable, and coupling the winch system to electrical power at step 210. At step 212, providing a winch system. Step 214 includes providing the towed AERA bodies. At step 216, couple winch system to the first and second towed AERA bodies respectively via the first and second tow cable system and FOTC.

Figure 10:
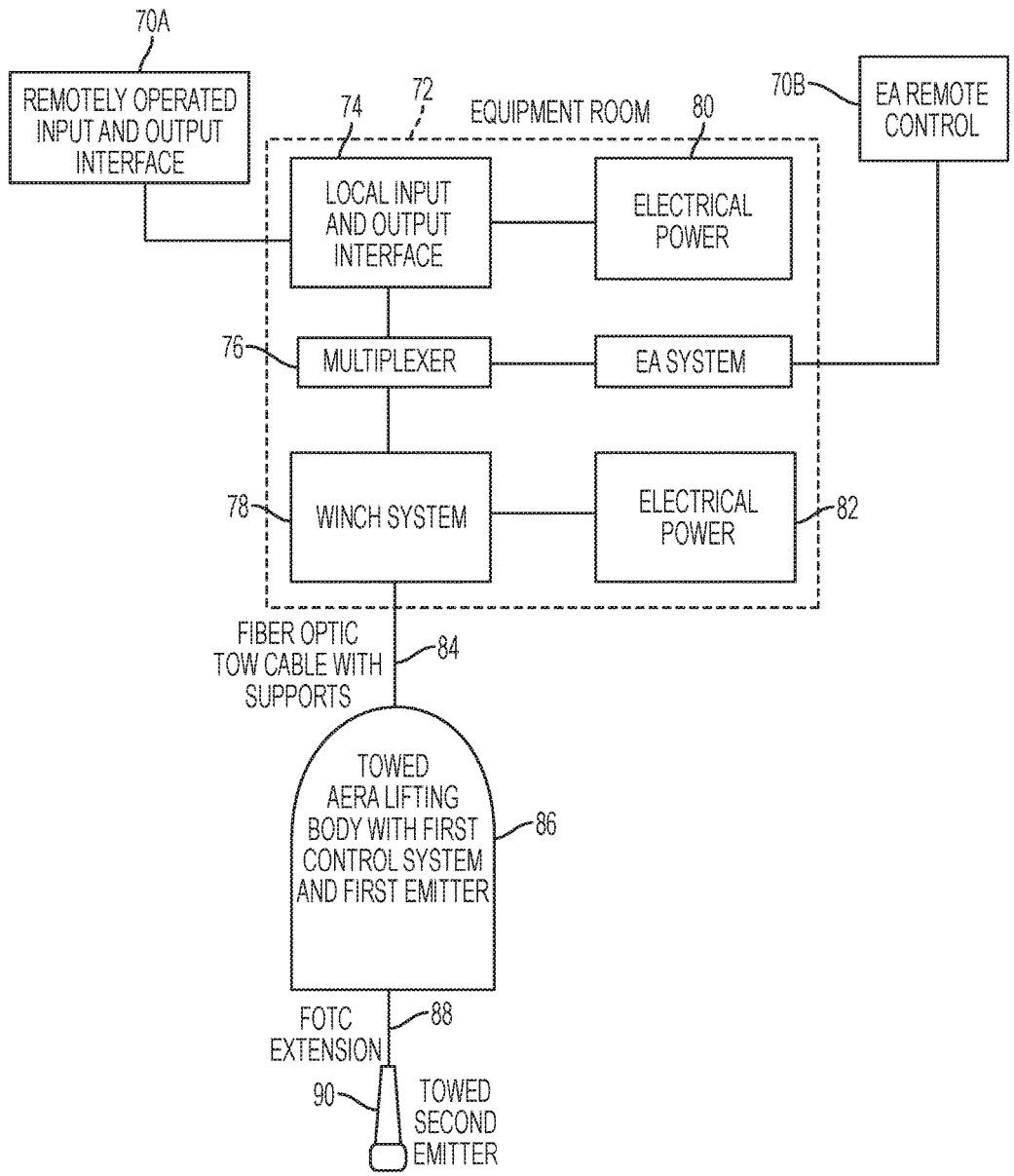
FIG. 10 shows another simplified system level diagram of an additional embodiment as disclosed herein.

Referring to FIG. 10, shown is a block diagram of an additional embodiment. In embodiments a remotely operated input and output interface 70A can be connected to an equipment room 72. An equipment room can include a local input and output interface 74, which can be attached to a vessel's electrical power 80. Additionally, an equipment room 72 can include a multiplexer 76, which is attached to the local input and output interface 74, and attached to the winch system 78. The multiplexer can permit interfacing between the existing towed body 86 and the towed emitter 90. For example, the multiplexer can utilize both towed body 86 and EA system from the equipment local input and output interface 74 or the remote input and output interface 70A for the towed body 86 and the towed emitter 90 to add operability. A winch system 78 can be attached to a vessel's electrical power 82 or can have its own power source through a battery source (not shown). A winch system 78 can be attached to a FOTC 84, which can be attached to a towed AERA body 86. To prevent binding and tangling and to allow free rotation between the winch system 78, FOTC 84, and towed AERA body 86 a rotation device (not shown) can be attached to the towed AERA body, and the winch system such as, for example, a slip ring, or the like. In certain embodiments a towed AERA body 86 can have an FOTC extension 88, which can connect a towed anti-threat body 90. In certain embodiments an anti-rotation device (not shown) can be attached to a towed AERA body 86, and can connect a FOTC extension 88, and towed anti-threat body 90.

Note that an exemplary method embodiment can add a step of providing a cutoff switch and/or providing a multiplexer into one section of an exemplary control system such as described above. An exemplary towed AERA body can be formed with a top section and a bottom section where an exemplary top section can be adapted so that an electrical housing can be attached to it. Additionally, an exemplary top section can have a first and second towing cable with a fiber optic extension adapted to attach to the top section and the electrical housing. An exemplary bottom section can have a plurality of struts protruding perpendicular from the bottom section. An exemplary plurality of struts can have a plurality of foils perpendicular protruding from the struts.

An anti-threat system can also be disposed on the first and second exemplary towed AERA bodies. Such an anti-threat system can operate to attract attention or alter behavior of a threat to a towing structure.

Figure 11:
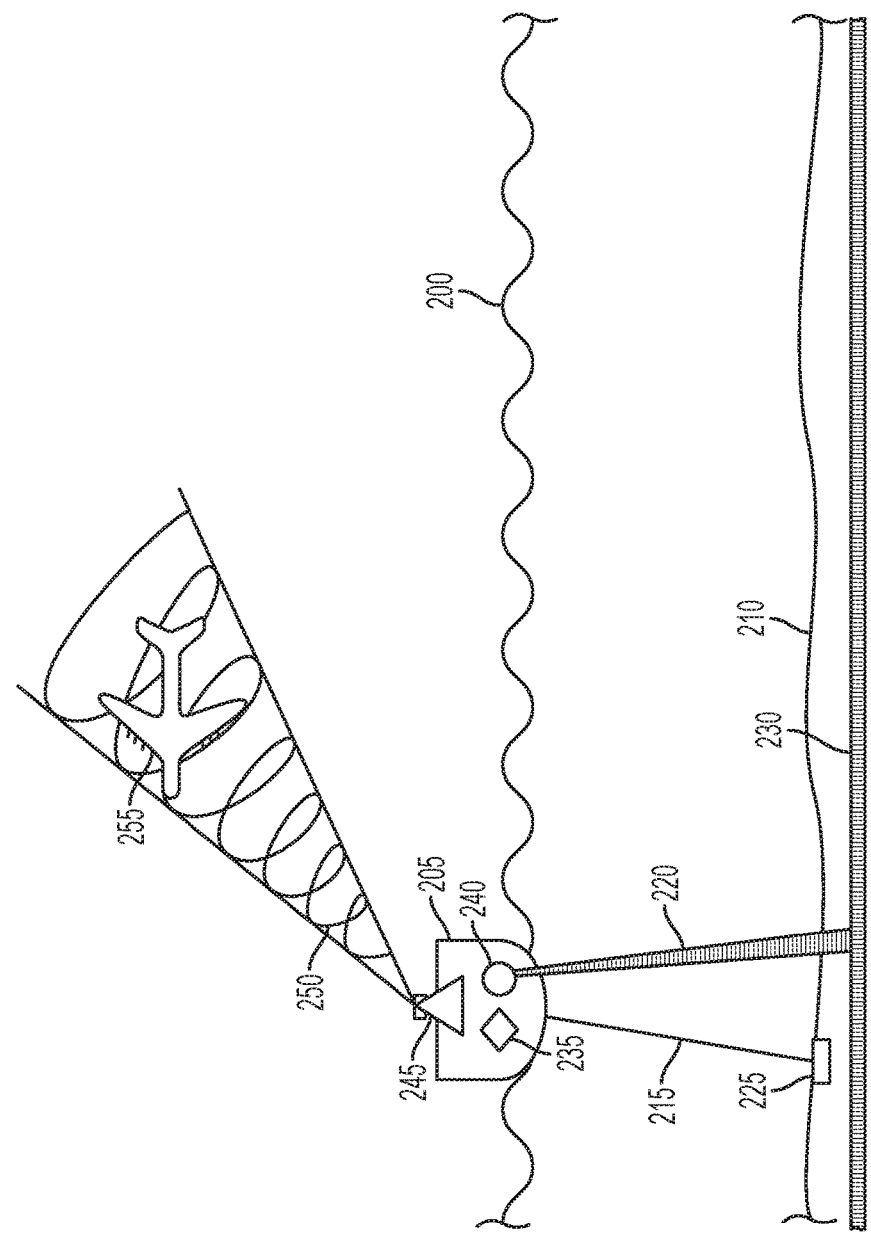
FIG. 11 shows a buoy connected to the ocean floor and an underwater fiber-optic cable line, including a radar detection system.

Referring to FIG. 11, another alternate embodiment of the disclosure that can include a buoy 205 on the ocean surface 200, which is tethered to the ocean floor 210 via a cable 215 and an anchor on the ocean floor 225. The buoy contains a power generation system 235, a control and communication system 240, and a radar detection system 245. A cable in the form of a fiber optic cable 220 connects an existing ocean floor fiber optic cable 230 to the control communication system 240 on board the buoy 205. The exemplary cable 220 includes a plurality of signal transfer lines (not shown as they are internal to the cable 220) comprising a first and second plurality of signal transfer lines in the cable 220, wherein said first plurality of signal transfer lines couple with the cable 230 connected to a first plurality of communication nodes (not shown) and said second plurality of signal transfer lines couple to control sections of at least one control section with said buoy 205. The exemplary radar detection system 245 transmits pulses radio or microwaves to determine the range, altitude, direction, or speed of objects above the ocean level or in the air. Examples of detectable objects include airplanes, ships, rocks, airborne objects, missiles, etc.

Figure 12:
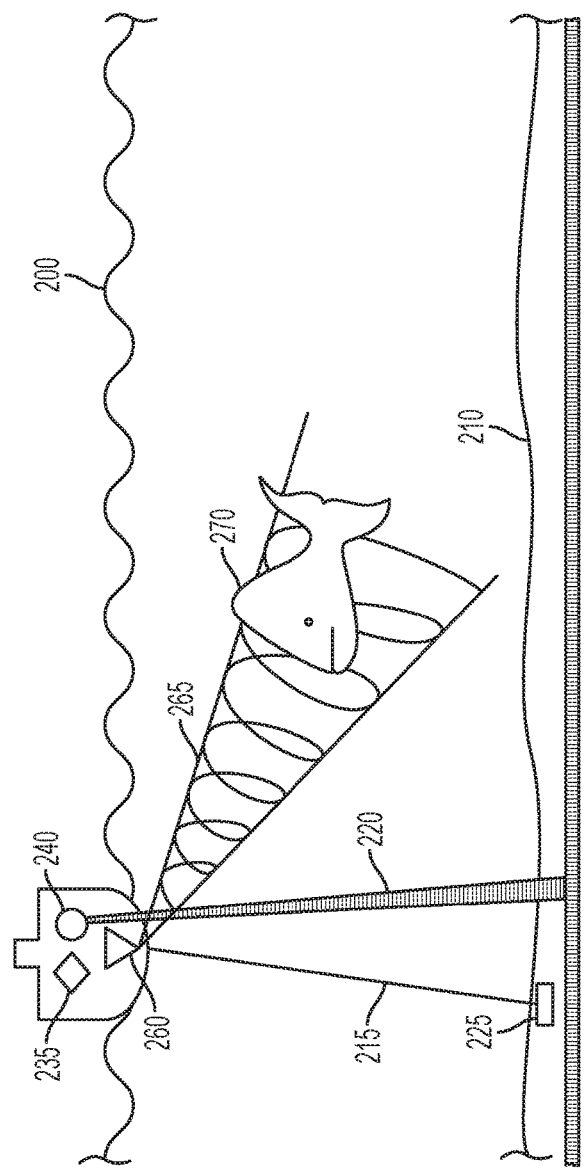
FIG. 12 shows a buoy connected to the ocean floor and an underwater fiber-optic cable line, including a sonar detection system.

Referring to FIG. 12, another alternate embodiment of the invention can include a buoy 205 on the ocean surface 200, which is tethered to the ocean floor 210 via a cable 215 and an anchor on the ocean floor 225. The buoy contains a power generation system 235, a control communication system 240, and a sonar sensor system 260 configured to transmit and/or detect sonar or sounds in the ocean. A cable in the form of a fiber optic cable 220 connects an existing ocean floor fiber optic cable 230 to the control communication system 240 on board the buoy 205. There are a plurality of signal transfer lines in the cable comprising a first and second plurality of signal transfer lines in the cable, wherein the first plurality couple a first plurality and a second plurality of communication nodes and said second plurality of signal transfer lines couple to control sections of at least one control section with said buoy. The sonar source and transmission are configured to selectively operate active or passive sonar technology using sound propagation to detect underwater objects. The frequencies emitted by active sonar can additionally be used to deter underwater animals by emitting particular frequencies. For example, by emitting mid-frequency active sonar, whales can be deterred from an area.

Examples of detectable objects include animals, shipwrecks, plane crashes, torpedoes, and rocks. In one example, a system can be used to detect a flight data recorder from crashed aircraft as well as detect sound profiles associated with aircraft crashes which propagate impact sounds through ocean water. When such impacts are detected or a flight data recorder "pings" are detected by the sonar 260, the control and communication system 240 can send a signal through the existing ocean floor cable fiber optic cable 230 to a remote control section or center (not shown) to alert authorities of a crash and possibly a location of the flight data recorder.

Figure 13:
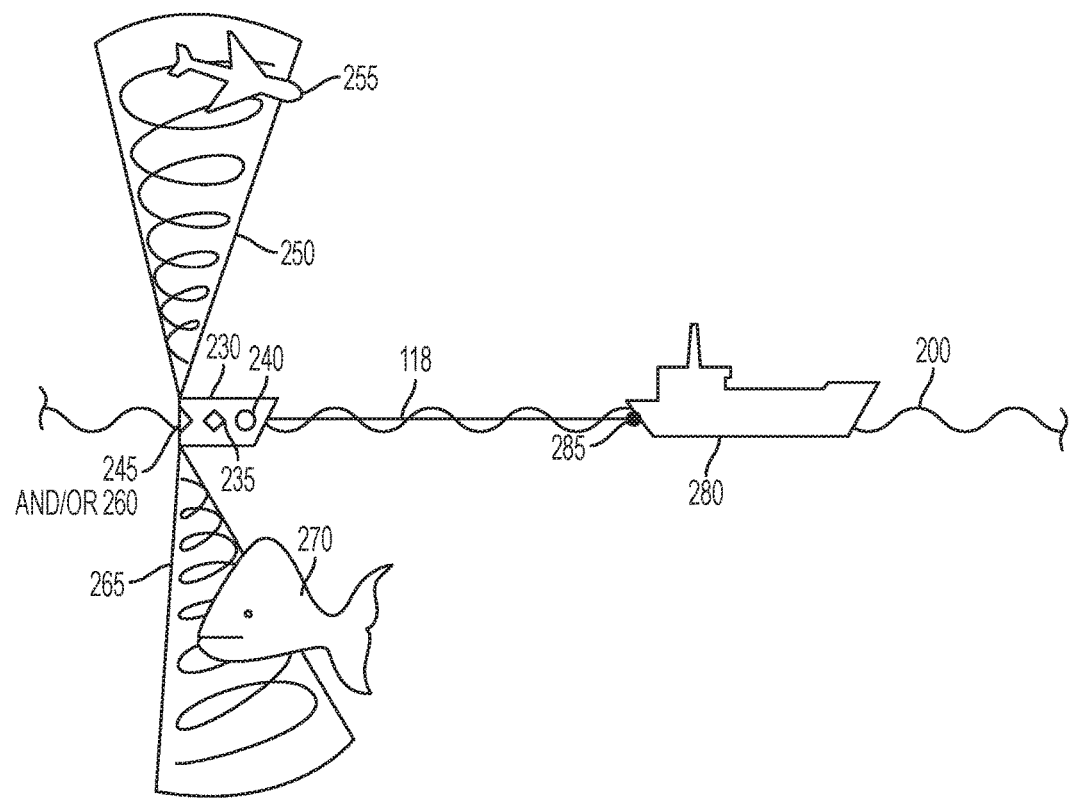
FIG. 13 shows a water vehicle connected to a sled via a fiber-optic cable, wherein the sled contains sonar and/or radar detection systems.

Referring to FIG. 13, another embodiment of the invention can include a water vehicle 280 with a winch 285 that is used to wrap fiber optic cable 118. The fiber optic cable 118 can be of varying length and can attach to a sled 290. The sled 290 contains a control communication system 240, a power generation system 235, and a radar or sonar system. A plurality of signal transfer lines in the cable 118 comprising a first and second plurality of signal transfer lines in the cable 118, wherein the first plurality couple a first plurality and a second plurality of communication nodes and the second plurality of signal transfer lines couple to control sections of at least one control section with the sled 290. The radar detection system 245 can use radars 250 as described above to detect objects above sea level whereas the sonar sensor system 260 can use sonar to detect objects below the ocean surface.

Figure 14:
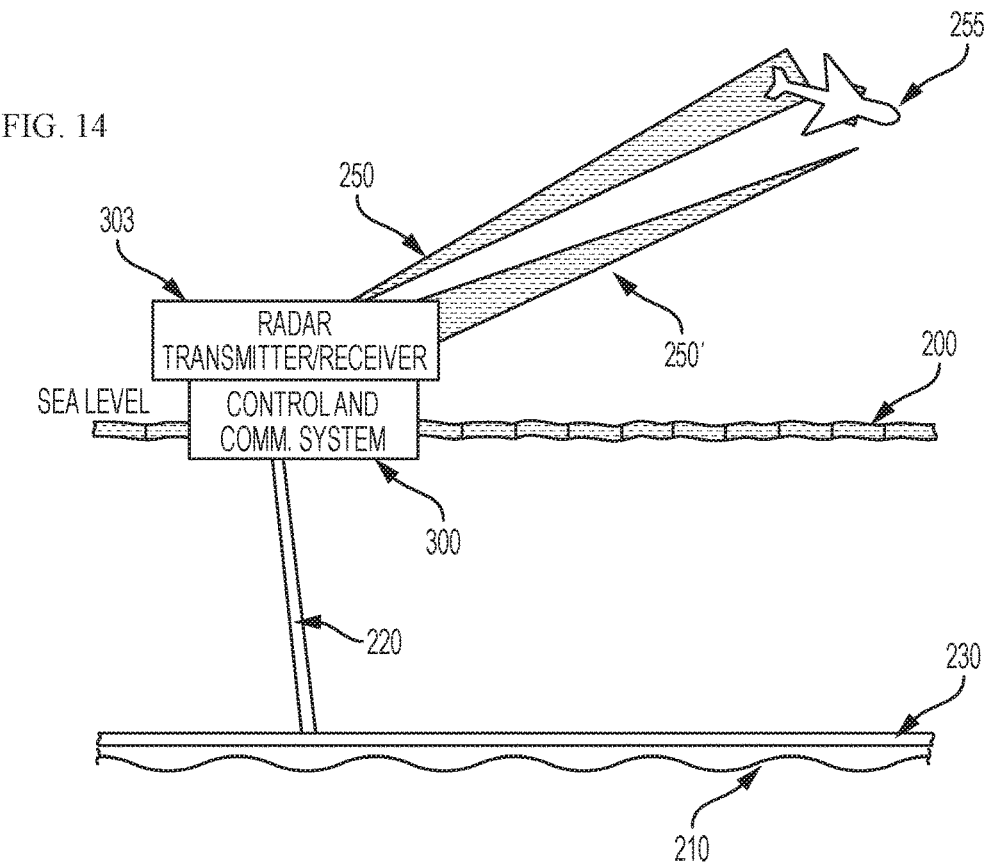
FIG. 14 shows an exemplary method of operation associated with an embodiment including a radar system.

Referring to FIG. 14, another embodiment of this disclosure can include a system for detecting objects above sea level using a detections system that can include a radar. The exemplary system can send electromagnetic waves or signals 250 from a radar transmitter 303. The radar waves bounce off 250' an above sea level detectable object in the path of the wave 255. The detectable object reflects a part of the wave's energy 250' back to the radar transmitter/receiver 303 and then communicates with a control communication system/receiver 300 which may be located in the same general location as the transmitter or may be found at another location. The control communication system/receiver sends information through a fiber optic cable 220 connected to an existing fiber optic cable 230 on the ocean floor 210. This data can be further relayed through the fiber optic cable on sea floor to a receiver on land. This provides a method of transferring data where satellites are inaccessible or existing communication is weak or unavailable.

Figure 15:
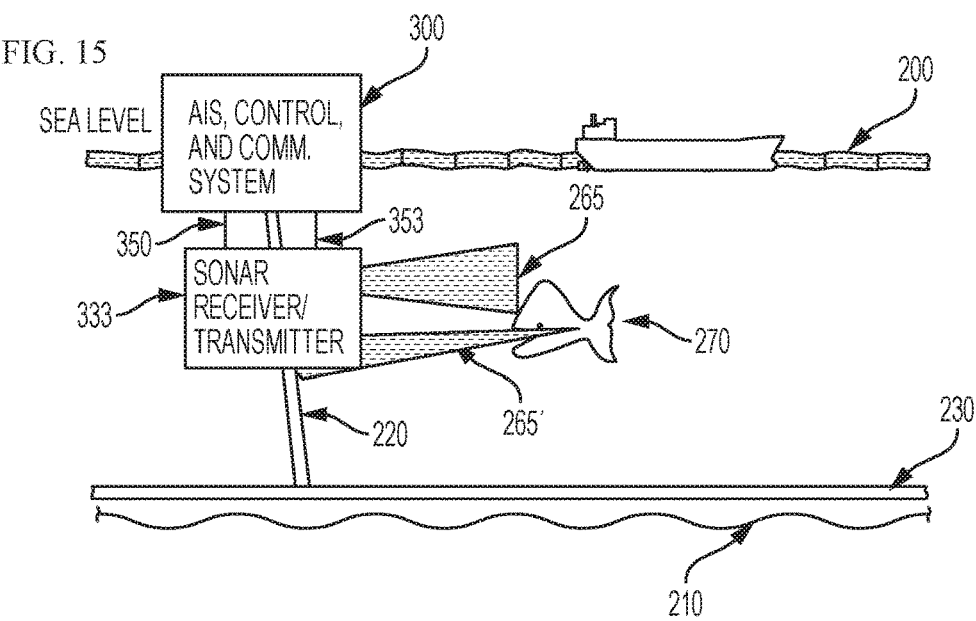
FIG. 15 shows an exemplary method of operation associated with an embodiment including a sonar system.

Referring to FIG. 15, another embodiment of invention can include a system of detecting objects below sea level using sonar. The system can send sonar waves 265 to detect a plurality of sound signatures e.g. an impact sound beneath the ocean surface or whales. The Control and comm. system 300 sends a signal to the sonar receiver/transmitter 333 to emit an original sound or ping 265 that is reflected off the detected object 270 and a reflected wave 265' is sent back to a sonar receiver/transmitter 333. To increase effectiveness of sonar the receiver will move up and down through various ocean layers. The receiver will have a slight negative buoyancy and be lifted through layers via control cable 353.

The receiver can relay the information through communication cable 350 or a fiber optic cable 220 connected to an existing fiber optic cable 230 on the ocean floor 210. Data can be further relayed through the fiber optic cable on sea floor to a receiver on land. This provides a method of transferring data where satellites are inaccessible or existing communication is weak or unavailable. The receiver can have a temperature, salinity, and buoyancy control system.

Referring to FIGS. 14 and 15, exemplary sonar or radar can be located on either a floating buoy or pulled behind a water vehicle. The data receiver may be located on board the buoy or pulled sled, or it may be located remotely.

Figure 16:
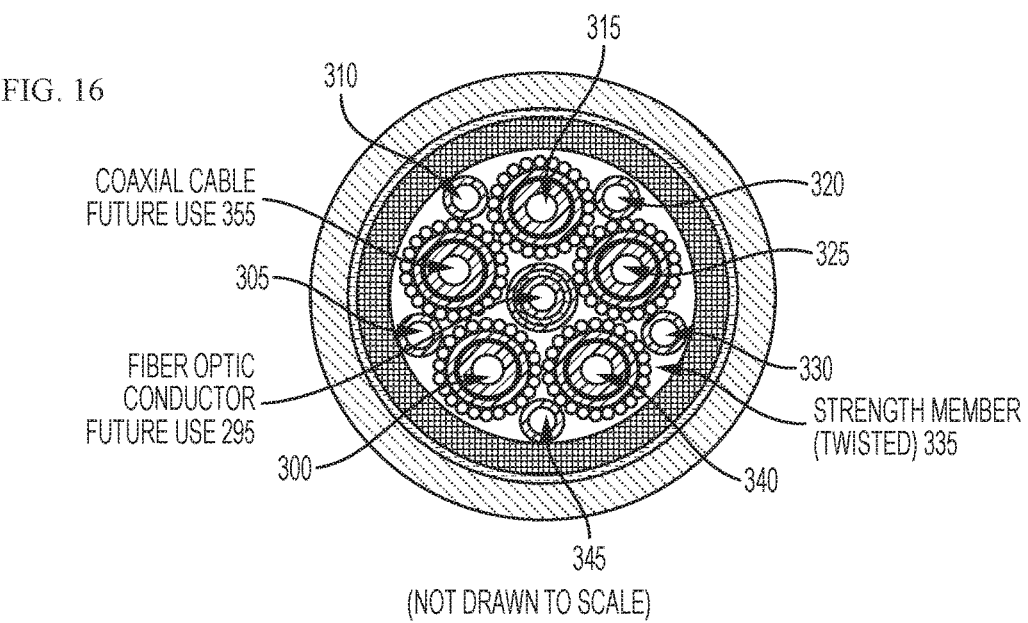
FIG. 16 shows a cross sectional view of a FOTC initially designed for a first application that is used in a modification to add a second application or capability in accordance with an embodiment of the invention.

Referring to FIG. 16, another embodiment of the invention can include utilization of an existing fiber optic tow cable coupled with an apparatus selected from the group consisting of a sonar system, a radar system, an imaging sonar system, an underwater towed sensor/emitter system, a ship towed active radio frequency decoy sled, and a towed body. The existing FOTC can include an outer sheave 350 which encloses an inner sheave 355. Both sheaves enclose a lead shielding 360 that surrounds emitter/receiver A (E/R A) first though $9^{th}$ signal buses (1SB, 2SB, 3SB, 4SB, 5SB, 6SB, 7SB, 8SB, 9SB) cables 300/305/310/315/320/325/330/340/345, and future use E/R B cables 295 ($10^{th}$ signal bus) and 355 ($11^{th}$ signal bus). The E/R A and E/R B cables are surrounded by an insulator 365/370 and a conductor 375. The cables are also surrounded by a twisted strength member 335. The outer sheave can be made of a hard material like PVC. The inner sheave can be made of a clear hard material like plastic. The lead shielding can consist of five layers alternatively wrapped. The insulators can be a solid material like PVC or fiberglass. The conductor can be a material that allows the flow of electrical current like copper or glass. Said cables consist of a first group and a second group of cables. The first group of cables are intended for established uses, including a torpedo decoy system. The second group of cables are reserved for future use and are able to be repurposed. Uses for the second cables suggested as embodiments of this invention include a sonar system, a radar system, and a ship towed active radio frequency decoy sled.

An embodiment of the invention includes manufacturing a set of a plurality of wires or transfer lines in a cable wherein the set includes a first and a second group of wires or transfer lines in the cable. The first group of wires or lines includes fiber optic cables that can be potentially coupled with a torpedo decoy. The second set of wires or lines can be decoupled or can potentially be modified to be coupled with at least one control section of a towed sled. The towed sled can include a power generation system, a control and communication system, and a radar or sonar detection system.

Figure 17:
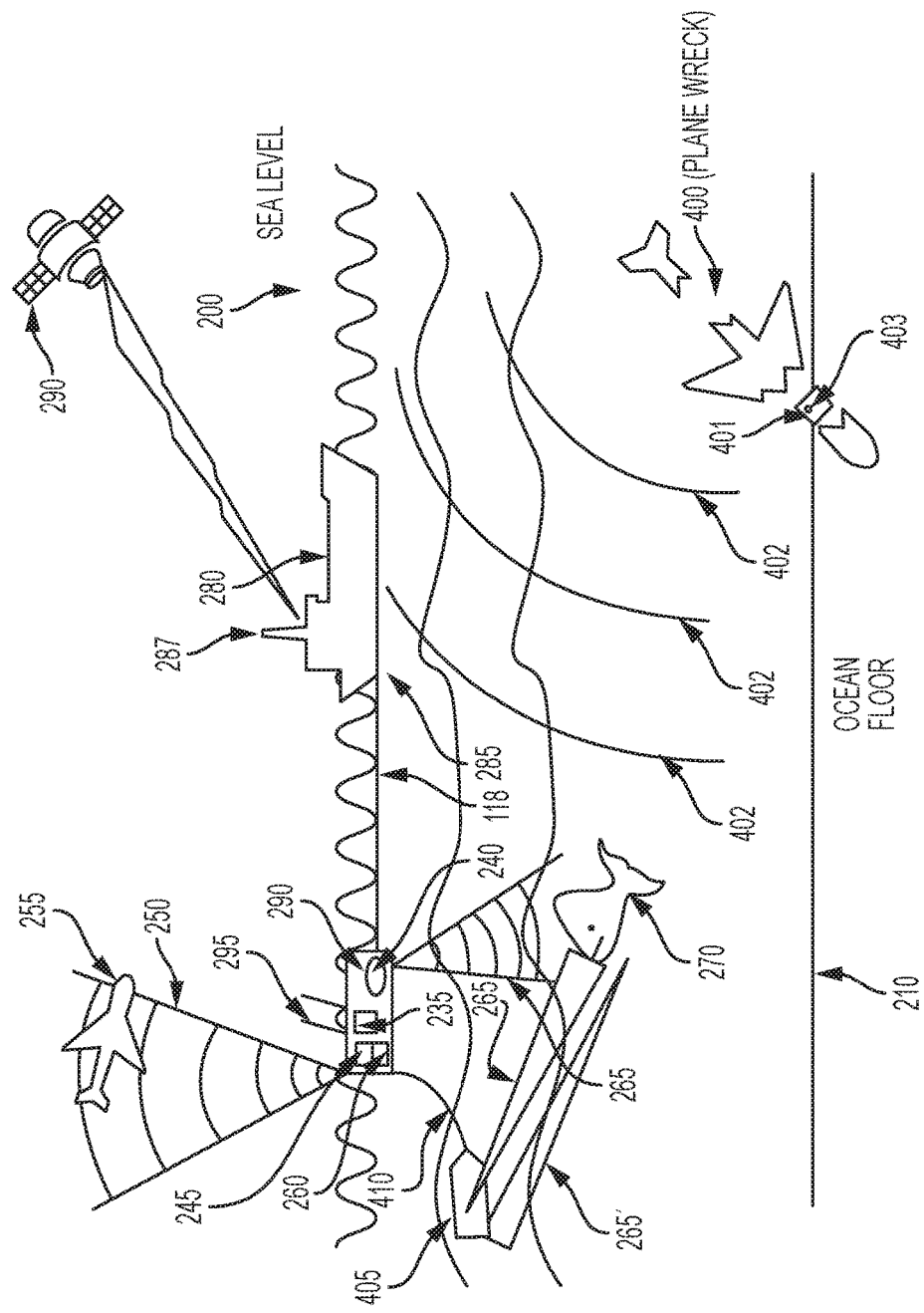
FIG. 17 shows another embodiment of the invention that can include a water borne autonomous renewable energy powered vessel with a multiple sensor and communication towed systems including a towed afloat radio frequency aerial object sensing and communication system as well as an underwater towed sonar system collectively configured to communicate with a satellite communication system.

Referring to FIG. 17, another embodiment of the invention that can include a water borne autonomous renewable energy powered vessel 280 with a multiple sensor and communication towed systems including a towed afloat radio frequency aerial object sensing and communication system 290 as well as a towed underwater system (e.g., sonar system) 405 collectively configured to communicate with a satellite communication system. In particular, the exemplary water borne vehicle 280 can also be configured with a retraction system or winch 285 that can be used to reel in or out fiber optic cable 118 which serves as a tow and data communication/control system for towed system or sled 290. The fiber optic cable 118 can be of varying length and is configured to selectively or removably attach to the towed system or sled 290. The towed system or sled 290 can include a control communication system 260, a power generation/management system 235, and a radar 245 and/or sonar system 240. The fiber optic cable 118 can include signal transfer lines comprising a first and second plurality of signal transfer lines in the cable, wherein the first plurality couple a first plurality and a second plurality of communication nodes and said second plurality of signal transfer lines couple to control sections of at least one control section with the towed system or sled 290. The radar detection system 245 can use radars emissions 250 as described herein to detect objects above sea level whereas the sonar sensor system 240 can use sonar 265 to detect objects below the ocean surface. The towed system or sled 290 can include a renewable energy system e.g., solar panels 295, at appropriate locations relative to the sun to maximize sun exposure. Such solar panels 295 can be fixed in a flat position on the towed system or sled 290 or be in a raised position with control sections (not shown) which orient the solar panels 295 so they are substantially orthogonal to the Sun. The solar panel system 295 can also be configured with a storm protection system which lays elevated solar panels 295 flat against the sled with clamps or coupling sections that secure the solar panels 295 in a storm configuration to reduce potential for storm damage. Additional storm protection structures can be provided including a cover section which either covers the solar panels 295 or enables the solar panels 295 to be covered or protected against storm damage. An on board battery (not shown) stores power output from the solar panels 295. A power management system can be configured to selectively power different systems based on different power savings conditions including remote configuration transmitted remotely from, e.g., satellite system 290. The towed system or sled 290 can include an autonomous system 405 attached to the water borne autonomous renewable energy powered vessel 280 via a fiber optic cable 410. The autonomous system 405 can utilize a sonar system to detect underwater objects. For example, a ping from a flight data recorder 401 could be detected by the towed underwater system 405 that is dragged behind a ship. Underwater objects 400, including plane wreckage, can also be detected using a side scanner sonars (not shown) mounted on, e.g., the towed underwater system 405. A sound wave 402 emitted from a pinger 403 in an aircraft flight recorder box 401 can be detected by towed underwater system 405 or the towed side scanner sonar system on the towed underwater system 405. The towed system or sled 290 can also mount or include a video camera (not shown) with an ability to swivel to remote control or automated control track objects through a three hundred and sixty degree azimuth and one hundred and eighty degrees of elevation.

Figure 18:
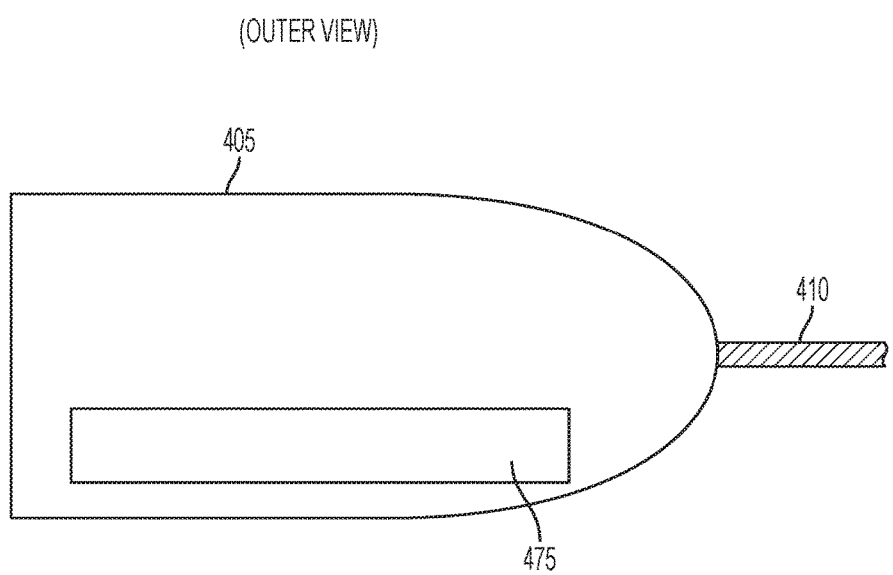
FIG. 18 shows an external view of a simplified view of an exemplary towed underwater system used in accordance with one embodiment of the invention.

Referring to FIG. 18, an outside view of an alternative towed underwater system 405 is shown. The towed underwater system 405 can include a side scanning sonar 475. The exemplary system can also include a fiber optic cable 410 to connect it to other bodies, including a towed system, floating towed buoy, sled, or a ship.

Figure 19:
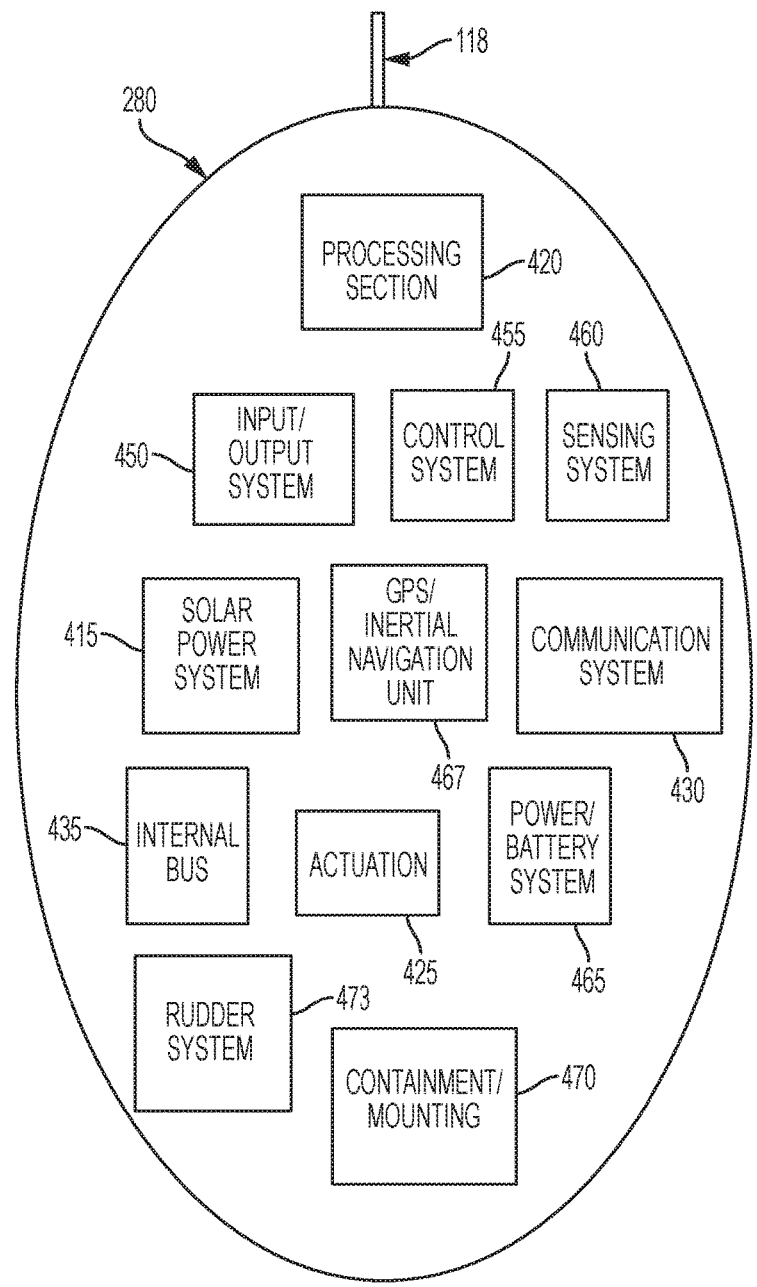
FIG. 19 shows an exemplary simplified functional block diagram for systems within an exemplary a water borne autonomous renewable energy powered vessel used as a tow system for a towed surface and underwater system.

Referring to FIG. 19, some exemplary components of the water borne autonomous renewable energy powered vessel 280 are shown. Subsystem components can include a solar power system 415, a processing section 420, an actuation 425, communication system 430, internal bus 435, an input/output system 450, a control system 455, a sensing system 460, a power system 465, and containment/mounting 470. The processing section 420 can control systems below the water surface. The exemplary actuation 425 can include the remote control sail winch and control systems and the rudder. The exemplary communication system 430 can include a transmitter/receiver for remote communication, a wireless transmitter and ability to communicate with actuators, and other elements. The towed system or sled 290 can be pulled behind and attached to the water borne autonomous renewable energy powered vessel 280 via a fiber optic cable 118.

Some implementations could also include a system such as shown in EP0498388 B1 the contents of which are incorporated by reference herein.

Various embodiments of an exemplary waterborne renewable energy vehicle 280, e.g., an automated sailboat system can include a variety subsystems. For example, some primary subsystems and associated requirements can be described in modular system architectures where each subsystem is. A first functional system can include a processing system. An exemplary processing subsystem can provide various control capabilities as well as providing required computations for planning/execution of controlling various aspects of embodiments of the invention. An exemplary processing system can require an onboard system that factors in power issues, size, and heat dissipation. Another modular system can include an actuation system. The system is designed to allow human interaction at any point, therefore, the use of R/C components are crucial. As above power consumption is a concern as well as speed and accuracy. Actuators without holding torque requirement can be used e.g. wormdrive. Another subsystem can include a communication system. An exemplary communication can be configured to remain in communication with a base or control station to transmit data and receive corrections. Another modular system can include a control system. An exemplary control system can be configured to be operated via manual or automatic controls. If communications fail, an exemplary system can include a failsafe to return to a preprogrammed function and course. Another exemplary modular system can include a sensing system. Various Exemplary sensors can be used with appropriate algorithms as well as various sensors such as, e.g., global positioning system (GPS), inertial navigation system (INS), salinity, temperature, etc. usable for various functionalities associated with different embodiments of the invention. Another modular subsystem can include a power system. For example, an exemplary power system can include a fully integrated multi-source power system provided to appropriately power all systems in various embodiments. An exemplary multi-source power can be provided by various renewable energy source e.g. solar panels mounted on a structure, flexible solar sails 500, wave or water powered systems for example. Another modular system can include a containment/mounting system. Such a containment or mounting system can be adapted to be water tight and able to withstand consistent water intrusion while remaining easily accessible. A form factor of the exemplary water borne autonomous renewable energy powered vessel, e.g., automated sailboat system, 280 is limited on space, therefore, causing a need for a small form computer. For example, A Rabbit Navigation Board version 3.0 (NavBoard3) can be used in many autonomous guided exemplary embodiments. In this example, the NavBoard3 can be configured with Dynamic C programming language to control the Rabbit NavBoard3. The NavBoard3 can be configured with connections for various sensors and communication options also leaving room for further expansion beyond required functions.

Figure 20:
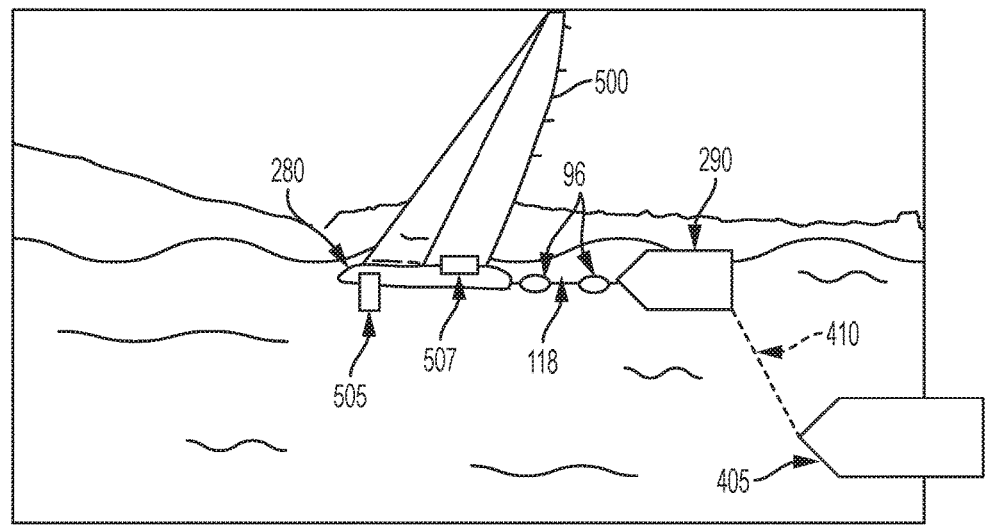
FIG. 20 shows an exemplary external view an exemplary water borne autonomous renewable energy powered vessel with functional simplified towed surface system and underwater towed system is shown.

Referring to FIG. 20, an exemplary external view an exemplary water borne autonomous renewable energy powered vessel 280 with functional simplified towed surface system 290 and underwater towed system 405. In particular, an exemplary automated sailboat system is shown that illustrates an exemplary robotic sailing system 280. The automated sailboat system can be used to pull a towed system or sled 290. The towed system or sled 290 can then pull an autonomous system 405 via fiber optic cable 410. The towed system or sled 290 can be pulled by a reinforced tow cable coupled with a fiber optic cable 118 attached to the automated sailboat system 280 with attached floatation devices 96 to keep the fiber optic cable 118 above water. A camera 507 with wide angle and zoom functions and a microphone 505 can be mounted on an external surface of the automated sailboat system 280 to assist with viewing and listening to airborne or biological entities.

Figure 21:
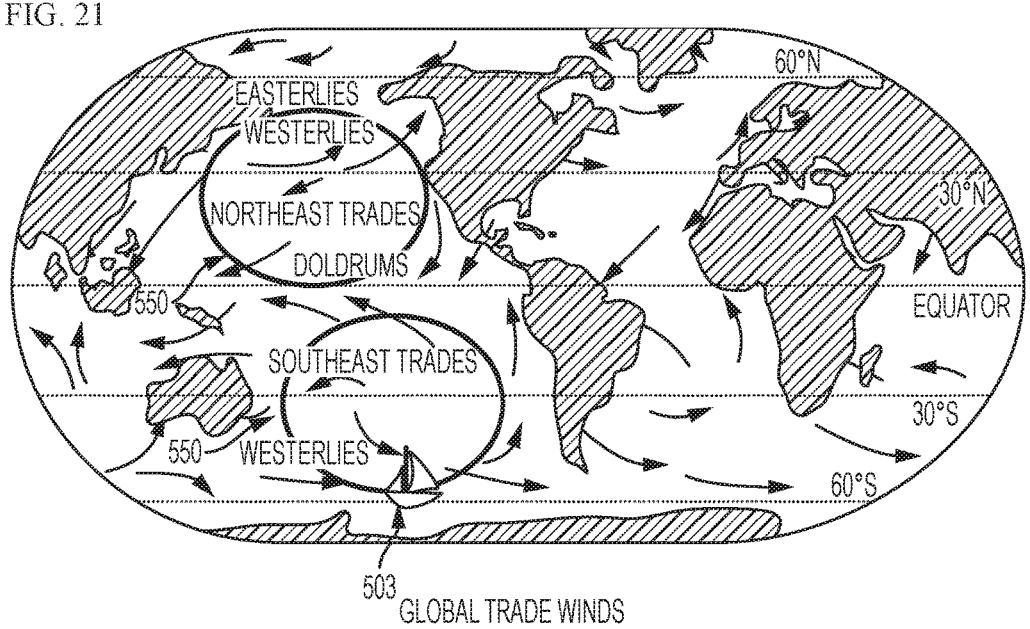
FIG. 21 shows an exemplary view of a patrol pattern with regard to wind patterns in a world map along trade winds.

Referring to FIG. 21, an exemplary illustration of an exemplary patrol grounds 550 is shown. Exemplary patrol ground pattern programming and routing can utilize trade winds and avoid doldrums to take advantage of further renewable energy available to create a continuous power source to move the waterborne autonomous renewable energy powered vessel, e.g., automated sailboat system 280. Additional embodiments can incorporate systems such as shown in U.S. Pat. No. 8,291,757 B2, the contents of which are contained herein, in order to use wind power for motive power.

Figure 22:
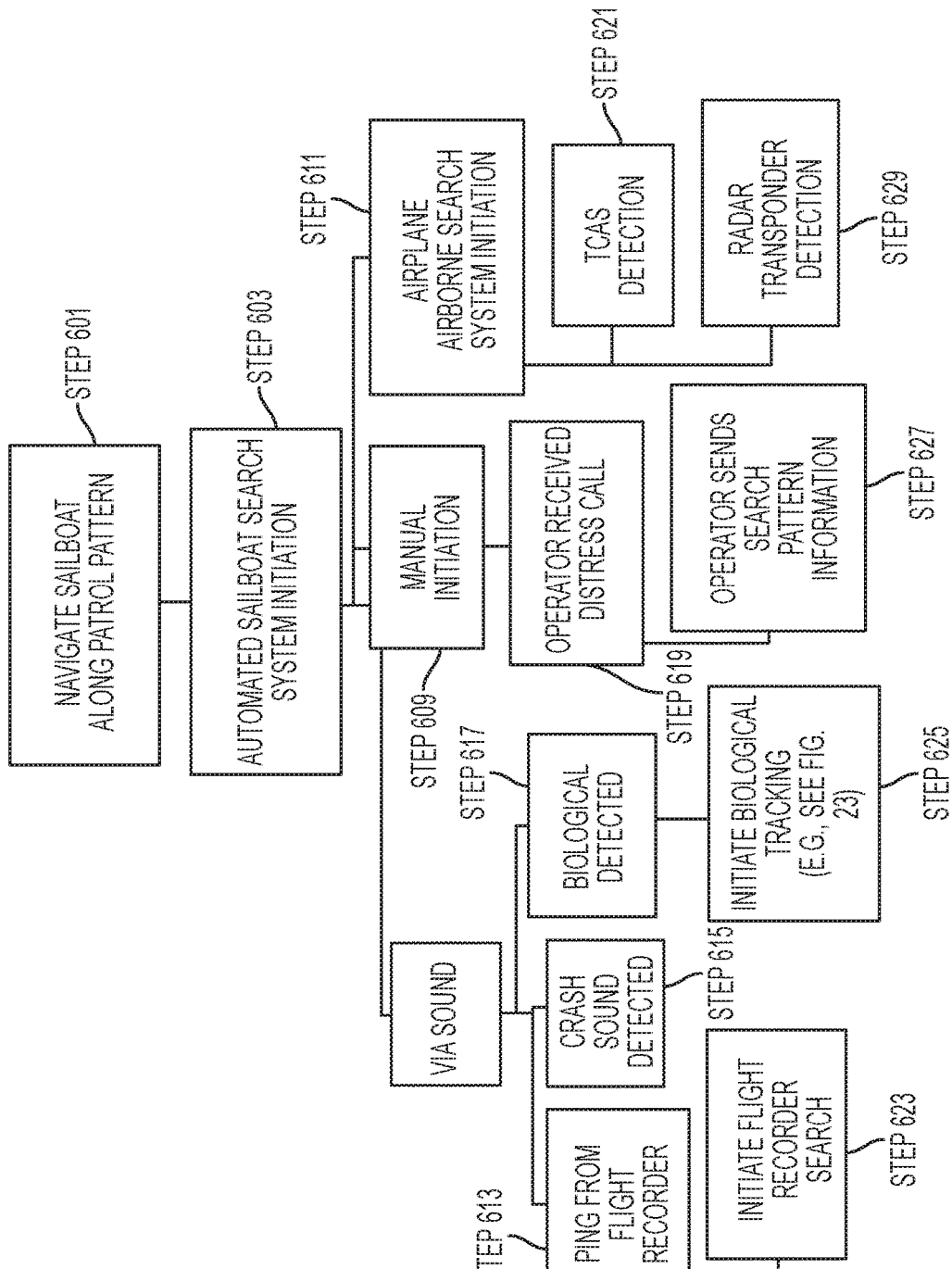
FIG. 22 shows an exemplary processing or control sequence at a higher level in accordance with one embodiment of the invention using the autonomous renewable energy powered vessel.

Referring to FIG. 22, shows varying functions and ways of initiation that the automated sailboat system can achieve e.g. sound, manually, or system initiations. These initiations will then trigger a preset routine. FIG. 22 shows various high level functions or steps. For example, step 601 navigate sailboat along patrol pattern. At step 603, automated sailboat search system is initiated. Various exemplary operations or functions can be provided for. For example, sound initiation can be provided to include sound initiation, manual initiation (Step 609) which can initiate processing at Step 619 (FIG. 25). At Step 611, an airplane airborne search system initiation then can initiate Step 621 traffic collision avoidance system (TCAS) detection, tracking, and storing for later reporting processing. At Step 611 can alternatively initiate Step 629 which includes aircraft radar transponder detection and recording. Sound initiation can include Step 613 activation via ping from a flight recorder which then initiates Step 623 initiate flight recorder search (See FIG. 26). At Step 615 a crash sound detection initiates processing at FIG. 24. At Step 617, biological detection initiates Step 625 biological tracking (see FIG. 23).

Figure 22A:
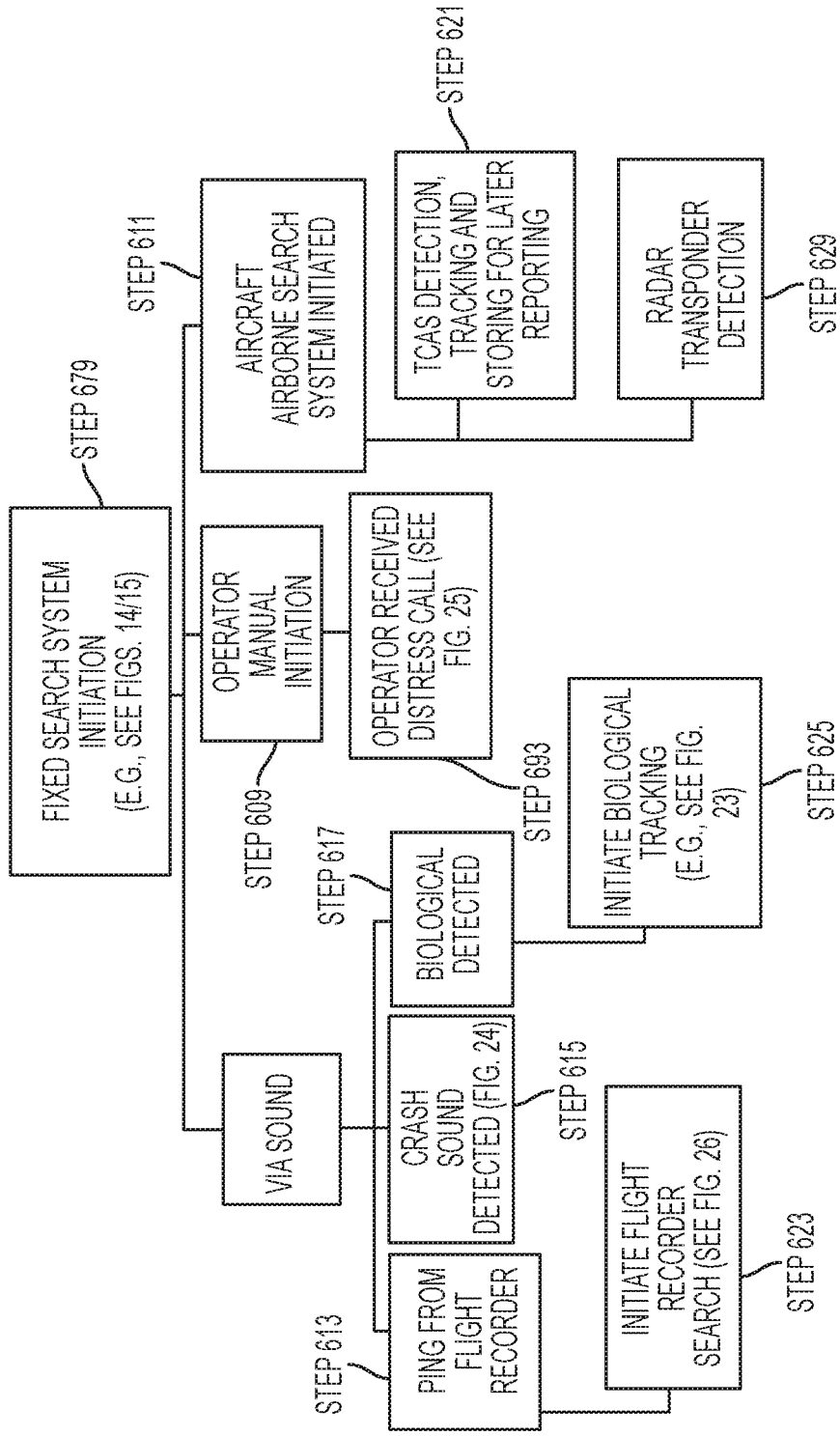
FIG. 22a shows an exemplary processing or control sequence at a higher level which is executed by control systems of an exemplary fixed site system.

Referring to FIG. 22a, at Step 679 a fixed search system is initiated (see FIGS. 14/15). This figure shows varying functions and ways of initiation that the fixed system can achieve e.g. sound, manually, or system initiations. These initiations can then trigger various routines. For example, sound initiation can be provided to include sound initiation (Steps 613, 615, or 617), manual initiation (Step 609), or aircraft airborne search system (Step 611). Step 609 manual operation can initiate operator received distress call at processing at Step 619 (FIG. 25). At Step 611, an airplane airborne search system initiation then can initiate Step 621 traffic collision avoidance system (TCAS) detection, tracking, and storing for later reporting processing. At Step 611 can alternatively initiate Step 629 which includes aircraft radar transponder detection and recording. Sound initiation can include Step 613 activation via ping from a flight recorder which then initiates Step 623 initiate flight recorder search (See FIG. 26). At Step 615 a crash sound detection by sonar and controls systems initiates processing at FIG. 24. At Step 617, biological detection by sonar and control systems initiates Step 625 biological tracking (see FIG. 23).

Figure 23:
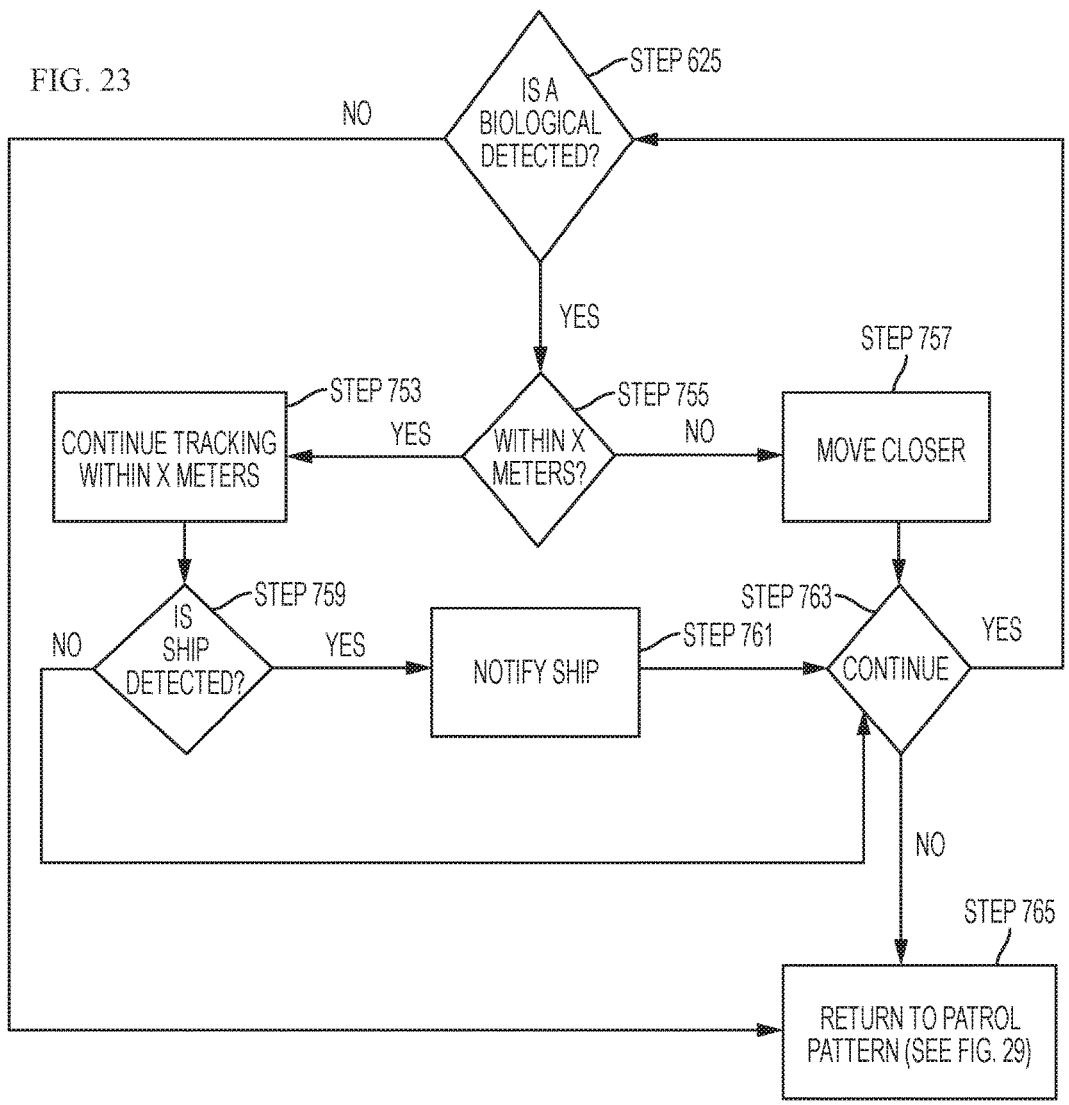
FIG. 23 shows an exemplary process for controlling the vessel and its systems in response to detection of a biological entity.

Referring to FIG. 23, at Step 625, a biological entity is detected by various elements of an embodiment of the invention e.g., sonar system and control system. Detection can occur in various ways including detection of a sound pattern via sonar and control system with pattern matching systems such as whale sound patterns by the control system. Specific patterns can be used to identify specific biological entity of interest while others are ignored. Once the biological entity is detected, at Step 755 the control system will determine if the biological entity is within a predetermined distance; if yes, then at Step 753 the controls system will continue controlling navigation systems to control the vehicle's course to maneuver the vehicle via tracking within the predetermined distance; if no, then at Step 757 the control system would maneuver the vehicle to move closer to a point of origin of the biological entity. Determinations of distance to the point of origin of the biological entity can be determined based on maintaining a baseline course then determining bearing to the biological entity from the vessel which can then be used as a basis for triangulation by the sonar and controls systems to the point of origin of the biological entity's sound. At Step 759, if a ship is detected then the ship is notified via various possible options such as having the control system activating a radar transponder to warn the ship of the presence of the biological entity in order to warn away the ship from the presence of the biological entity. An alternate embodiment can include a control system to notify the ship of the biological entity at Step 761 via a satellite communication or radio frequency communication system. At Step 763, a determination is made by a control section of an exemplary embodiment to continue or not, where if a determination is made to continue then processing returns to Step 625. If no, then processing continues at Step 765 which returns the vessel maneuvering to a predetermined patrol pattern (e.g., FIG. 29). If no biological entity is detected by the control and sonar system at Step 625, then processing continues at Step 765.

Figure 24:
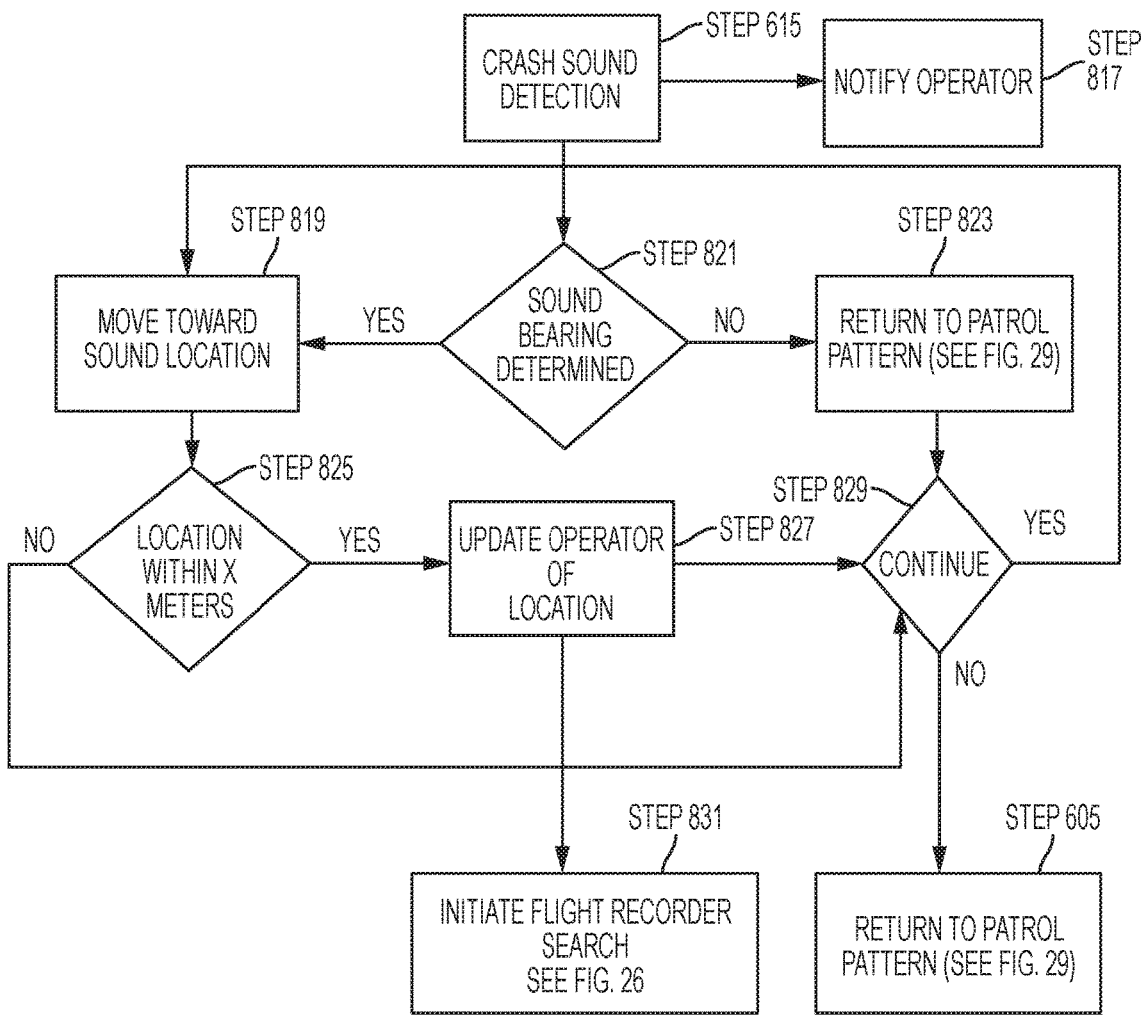
FIG. 24 shows an exemplary process for controlling the vessel and its systems in response to a crash sound detection.
Figure 25:
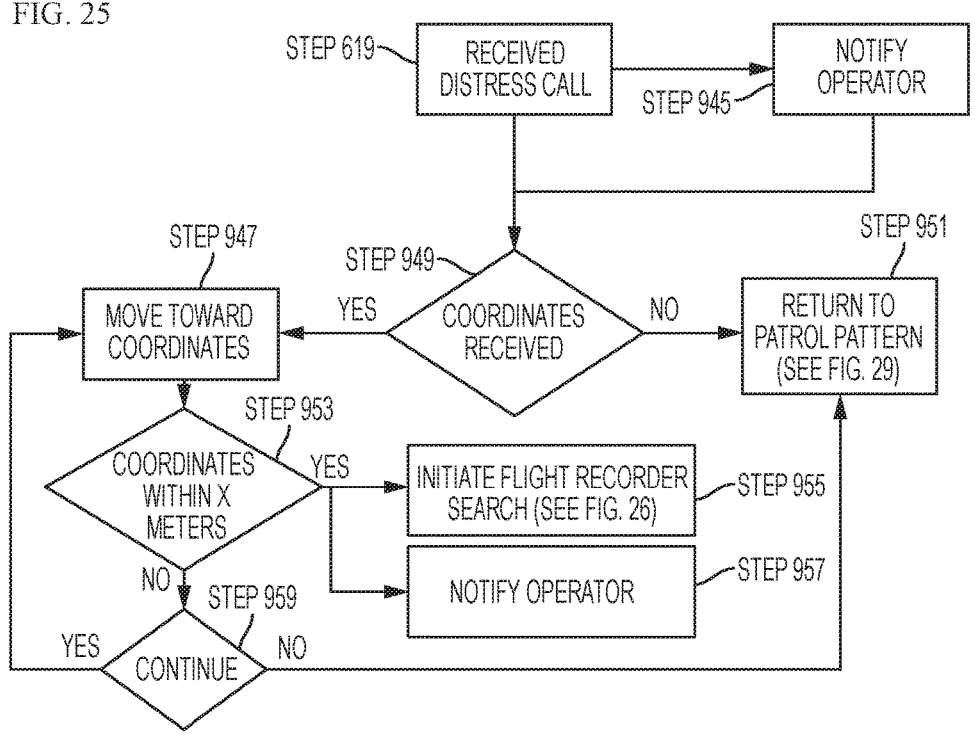
FIG. 25 shows an exemplary process for controlling the vessel, sonar, control, and other systems in response to a received distress call.

Referring to FIG. 24, at Step 615 a crash sound detection is detected by the sonar and control system. At Step 817, a control system and communication system will send a notification to an operator, e.g., air traffic control, or crash response organization. The detection can occur from a distinct sound pattern by the sonar and control system. Next, at Step 821, crash sound bearings are or are not determined where if the crash sound bearings (multiple bearings) are determined by using, e.g., a directional sonar array system to determine multiple bearing detections used to triangulate on a location or point of origin of the crash sound then processing continues at Step 819; else, where if no bearings and location are determined then processing is returned to a patrol patter (e.g., FIG. 22 as shown in, e.g., FIG. 29). At step 819, then the onboard control system, navigation system, and other onboard systems maneuver the vessel towards the sound location. At Step 825, then a determination is made to determine if the vessel is within a predetermined (X) distance, e.g., meters of the previously determined location. If not within the predetermined distance, then the control system uses predetermined control instructions to determine if the vessel continues the crash sound detection process and maneuvering. If a determination is made by the control system to continue, then processing returns to Step 819; else a no determination is made at Step 829 and continues at Step 605 which causes the controls system to maneuver the vessel back to the patrol pattern (e.g., see FIG. 29; FIG. 22). Maneuvering can be achieved through a series of sensors and actuators as discussed in FIG. 20. When Step 827 is executed after Step 825's determination that the crash sound is within a certain location, then an operator or crash notification entity will be notified or updated with a location (and status of search) followed by processing which continues at FIG. 26 as Step 623 initiate flight recorder search is initiated. If there on onboard system of the vessel 280 detects a ship in a predetermined proximity to the vessel, then the ship can also be through a communications system using, e.g. short range radio or can stay in constant or intermittent communication with the operator or ship via a satellite signal. Once the operator or rescue ships can begin rescue/salvage missions, the autonomous renewable energy powered vessel, e.g., the automated sailboat system, can return to its normal patrol grounds via a command to the vessel's control system from the operator or another entity.

Figure 24A:
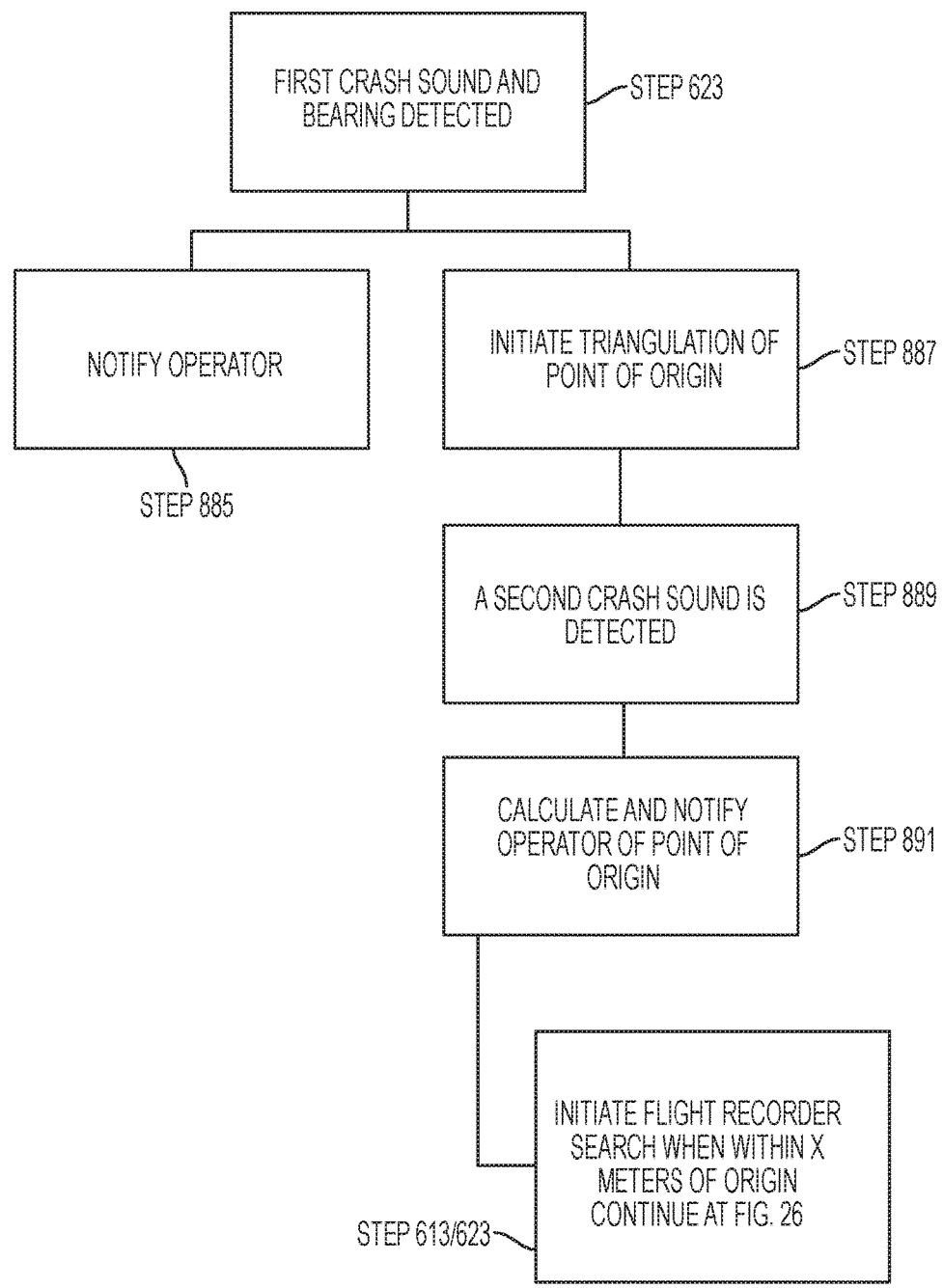
FIG. 24a shows an exemplary process for controlling sonar, control, and maneuvering systems to determine a point of origin of the crash sound.

Referring to FIG. 24a shows an exemplary process for controlling sonar, control, and maneuvering systems to determine a point of origin of the crash sound. At Step 623, a first crash sound and bearing is detected. At Step 885 an operator is notified when detection of the first crash sound is detected and bearing detected. At Step 887, control and sonar systems will initiate triangulation of point of origin of the first crash sound. At Step 889, a second crash sound is detected by the sonar and control system. At Step 891, the control and sonar system then calculate and notify an operator of point origin of the crash sounds. At Step 613/623, the control system initiate flight recorder search within a predetermined distance from the determined point of origin (see FIG. 26).

Referring to FIG. 25, shows exemplary process for controlling the vessel, sonar, control, and other systems in response to a received distress signal. At Step 619, a controls system receives the distress call. At Step 945, the control system uses the communication system to notify an operator, e.g., an air traffic controller, etc. At Step 949, the operator sends coordinates are not received, then at Step 951 the control system returns the vessel to its patrol pattern. At Step 947, if coordinates are received, then the control system configures the vessel for navigation and maneuvering towards the provided coordinates. At Step 953, then the control system makes a determination if the vessel's location is within a predetermined distance from the coordinates using, e.g., the GPS system, INS, etc; if yes, then at Step 955 then the control system initiates the flight recorder search at FIG. 26 and notifies an operator (e.g., air traffic control or search coordination center), of the vessel being within the predetermined coordinates. If the coordinates are not within the predetermined distance of the vessel, then the control system then makes a determination to continue navigating the vessel towards the coordinates at Step 947 or to return to the search pattern at Step 951. If a ship in radio is detected within a predetermined distance (e.g., search distance), the control system can operate components on in the system (e.g., communication system) to notify the ship through, e.g. short range radio or can stay in constant communication via a satellite signal. Once the ship begins rescue/salvage missions, the automated sailboat system can return to its normal patrol grounds via Step 951 and control system instructions to maneuver the vessel back to the search pattern.

Figure 26:
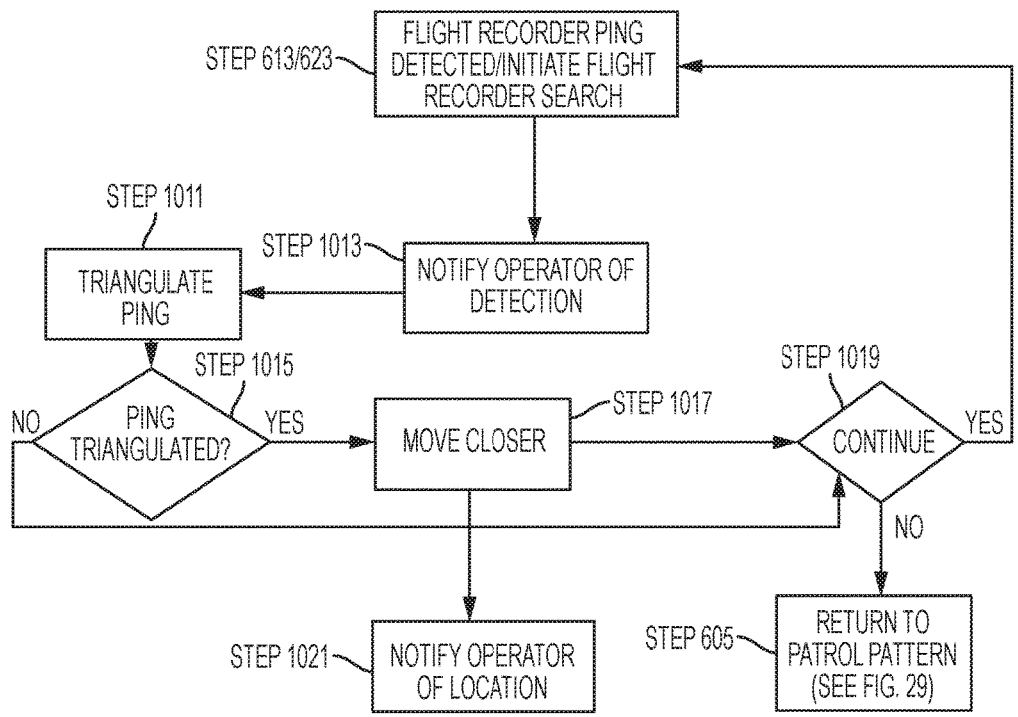
FIG. 26 shows an exemplary process for responding to detection of a flight recorder and controlling the vessel, sonar, control, and other relevant systems.

Referring to FIG. 26, at Step 613/623, the control system initiates flight recorder ping detection and initiation of flight recorder search instructions or control operations. Next, at Step 1013, the control system notifies the operator of detection of the flight recorder ping by the system sonar system. Next at Step 1011, a series of detections of the flight recorder pings are initiated along a base line course using the directional sonar array and control system. At Step 1015, if the ping from the flight recorder is triangulated, then at Step 1017 the control system maneuvers the vessel closer to a point of origin determined from the triangulation processing. At Step 1019, the control system (or manual inputs from, e.g., the operator via communication system) determines to continue flight recorder searching operations or not; if not, then the control system executes instructions to maneuver the vessel and return to the old or new patrol pattern. If Step 1019 determines continuation of the flight recorder ping detection and flight recorder search is to continue, then processing returns illustrates the function carried out when the automated sailboat system detects a flight recorder "black box" ping. The detection can occur numerous ways from distinct radar signature to sound pattern. Once the ping is detected the automated sailboat system will notify an operator (land or sea based automated sailboat observer) and move to within a set number of meters from the wreckage. This can be achieved through a series of sensors and actuators as discussed in FIG. 20. If there is a ship detected the automated sailboat system can notify the ship through numerous communications means e.g. short range radio or can stay in constant communication via a satellite signal. Once the ship begins rescue/salvage missions the automated sailboat system can return to its normal patrol grounds.

Figure 27:
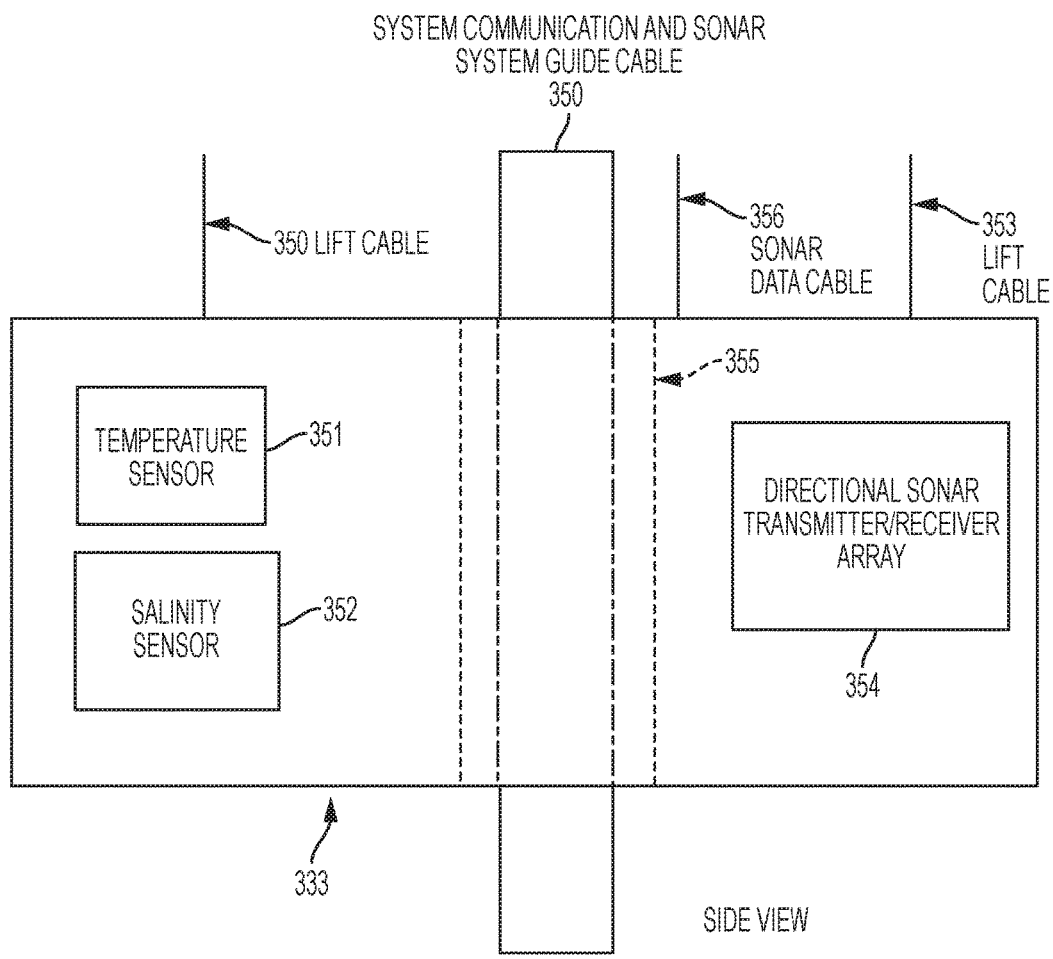
FIG. 27 shows an exemplary block diagram of a sonar system that is configured to be adjustably moved up and down a system communication and sonar cable from a fixed floating buoy.

Referring to FIG. 27, illustrates an exemplary sonar system 333 and the various sensors. The sonar system 333 can be designed to utilize a fiber optic data cable 350 and a control cable 353 to couple with a floating buoy such as described herein. A directional sonar receiver/transmitter array 354 is provided in the sonar system 333 for use in tracking underwater entities such as aircraft crashes or biologic entities. The sonar system 333 can be designed to maintain a slightly negative buoyancy while moving up and down through the layers via a reel or control cable winch. The sonar system 333 can be designed with an aperture 355 that a system communication and sonar system guide cable 350 that enables the sonar system 333 to move up and down the guide cable 350. The sonar system 333 can be configured to rollers or other structures (not shown) that would avoid damage to the guide cable 350 as it moves up and down. The exemplary sensor system 333 can use a temperature 351 and salinity sensor 352 to determine what layer the sonar system 333 is in that provides best sonar performance to detect underwater entities such as biologic entities, crash sounds, or aircraft flight recorder sonar pinger systems. The sonar system can be designed with an aperture 355 that is adapted to permit the sonar system 333 to move up and down will use a sonar sensor/microphone to listen for a sonar signature e.g. whale.

Figure 28:
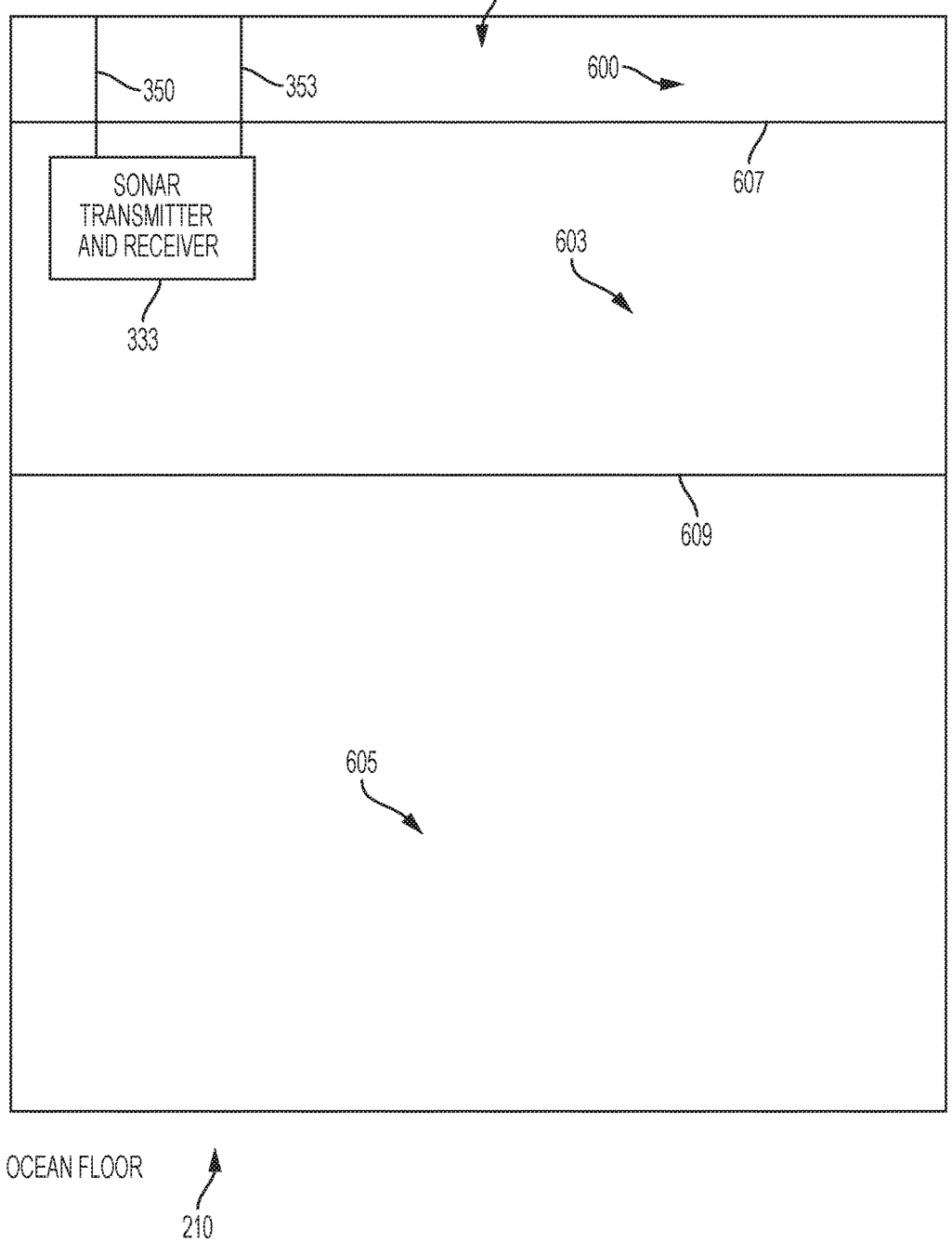
FIG. 28 shows a simplified side view of movement of the sonar system from FIG. 27 with respect to different sections of a body water having different sound carrying characteristics.

Referring to FIG. 28, illustrates sea (temperature/salinity) levels 600, 603, 605 a simplified sonar system 333 (See FIG. 27) will have to navigate through. The sonar system 333 can utilize a fiber optic data cable 350 and a control cable 353. Different boundaries 200, 607, 609 define boundaries of different layers 600, 603, 605 which can affect sonar performance.

Figure 29:
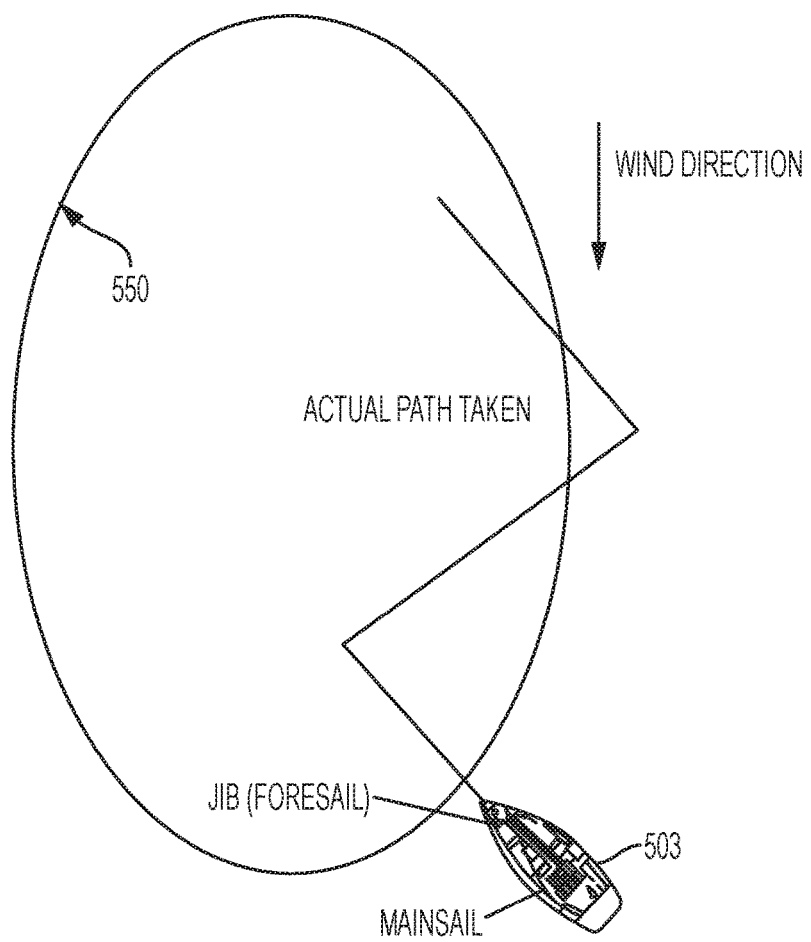
FIG. 29 shows an exemplary sailing path of the vessel with automated maneuvers with wind direction.

FIG. 29 shows an exemplary sailing path of the vessel 503 with automated maneuvers with wind direction. A patrol area is defined by a path route 550 which the automated sailboat 503 moves via a tacking course configured to stay within a predetermined distance from the path route 550.

Although the invention has been described in detail with reference to certain preferred embodiments, variations and modifications exist within the spirit and scope of the invention as described and defined in the following claims.

The invention claimed is:

1. A towed attraction/emulation/response alteration (AERA) system comprising:
   a control center comprising an input and output interface system;
   a winch system coupled to the input and output interface system;
   a first tow cable coupled to the winch system that comprises a fiber optic cable, said first tow cable further comprises a plurality of flotation or support sections spaced apart adapted to support the first tow cable;
   a first towed AERA body coupled to said first tow cable configured to receive control signals and power through said first tow cable, said first towed AERA body comprises at least a first emitter operable to emit a first plurality of signals, wherein said first towed AERA body comprises a support section operable to support said first towed AERA body above or within a fluid, wherein said first towed AERA body comprises a second control system that is in communication with said first control system, said second control system is operable to control said first emitter based on inputs from said first controls system or based on predetermined instructions;
   a second tow cable comprising second fiber optic cable extending from said first towed AERA body, said second two cable is coupled to said second control system;
   a second towed AERA body comprising a second emitter that is operable to either be towed above or on said fluid or underneath said fluid and is configured to receive control signals and power from said second control system; and
   a signal cutout switch, wherein said input and output interface and said winch system are connected to a signal cutout switch;
   wherein said local input and output interface and said winch system are connected to a multiplexer.

2. A towed AERA system as set forth in claim 1, wherein said input and output interface is configured to communicate through said first tow cable to said first towed AERA body.

3. A towed AERA system as set forth in claim 1, wherein said plurality of buoys are adapted with a shape to reduce drag from passage of said buoys through a fluid medium that supports said buoys.

4. A towed AERA system as set forth in claim 1, wherein an anti-threat body configured with a third emitter and is coupled to said first towed AERA body.

5. A towed AERA system as set forth in claim 1, wherein said first control center comprises a remote control system that selectively controls one or more elements of said AERA body via remote control, wherein said remote control comprises a separate radio frequency or laser communication system that communicates control signals with said first AERA system.

6. A search system comprising:
   an automated vessel and onboard systems comprising a propulsion system, a first search system, a first controller, a maneuvering system, a navigation system, a first power system, a first towed system interface system, and a first communication system;
   a first towed system comprising a second search system and a second communication system;
   a second towed system coupled to said first towed system, said second towed system configured to be towed underwater, said second towed system comprising a controls system, a third system interface section configured to transmit and receive data or signals to said first towed system, and a sonar system configured to directionally detect a plurality of sound patterns, said plurality of sound patterns are stored on a non-transitory data storage medium and configured to be read and used to match sounds detected by said sonar system with one or more of said plurality of sound patterns, said plurality of sound patterns comprising a sonar ping produced from a sonar pinger system coupled to an aircraft flight recorder, at least one aircraft water crash sound pattern, and a plurality of biologic sound patterns comprising one or more whale sounds;
   wherein the power system comprises a power storage system and a solar power system configured to provide power to the automated vessel;
   wherein the search system comprises a first traffic collision avoidance system (TCAS) configured to detect TCAS signals from aircraft configured with an aircraft TCAS;
   wherein the communication system comprises a radio frequency transceiver, a radio frequency radar transponder configured to transmit on naval navigation band frequencies to show a radar return and data on another vessel's navigation radar system;
   wherein the controller is configured to control components and systems on the automated vessel and search system comprising the search system, the controller, the maneuvering system, the navigation system, the power system, and the communication system;
   wherein the navigation system comprises a navigation management system configured to control the vehicle's course, a global positioning system and an inertial measuring unit including a connected to the controller;
   wherein the maneuvering system comprising a rudder and a rudder actuating system controlled by the controller, a sail control system configured to adjust the a first and second sail on the automated sailboat comprising a plurality of sail positioning actuator or control elements and a plurality of coupling sections respectively coupling the first and second sails to each of the plurality of sail positioning actuator or control elements.

* * * * *